US006556378B1

(12) United States Patent
Ota et al.

(10) Patent No.: US 6,556,378 B1
(45) Date of Patent: Apr. 29, 2003

(54) TAPE CASSETTE HAVING LID AND SLIDER OVERLAPPING PORTIONS

(75) Inventors: Takashi Ota, Miyagi; Shuichi Ota, Saitama, both of (JP)

(73) Assignee: Sony Corporation (JP)

( * ) Notice: Subject to any disclaimer, the term of this patent is extended or adjusted under 35 U.S.C. 154(b) by 139 days.

(21) Appl. No.: 09/711,879

(22) Filed: Nov. 15, 2000

(30) Foreign Application Priority Data

Nov. 17, 1999 (JP) .......................................... 11-327397

(51) Int. Cl.$^7$ .......................... G11B 23/02; G11B 23/04
(52) U.S. Cl. ..................................... 360/132; 242/347.1
(58) Field of Search ....................... 360/132; 242/347.1, 242/347.2

(56) References Cited

U.S. PATENT DOCUMENTS 6,345,778 B1 * 2/2002 Ota ......................... 242/347.1

* cited by examiner

*Primary Examiner*—A. J. Heinz
(74) *Attorney, Agent, or Firm*—Rader, Fishman & Grauer PLLC; Ronald P. Kananen, Esq.

(57) ABSTRACT

In a tape cassette 10 in which a mouth portion 21 opened in forward and up-and-down directions is provided at the front portion of a cassette shell 20 accommodating therein tape reels 40 and 50 having a magnetic tape 30 wound therearound, a part of the magnetic tape is located so as to traverse the front end of the mouth portion, and a front lid 60 for covering the front side of the magnetic tape is provided, a slider 80 is provided so as to be freely movable forwardly and downwardly, each side surface portion of the slider along the side surface of the front lid has a lid-support portion 83 at the front-end portion thereof and a main-surface portion 82 located so as to be farther outward than the lid-support portion, the front lid has a front-surface portion 61 covering the front surface of the tape-shaped recording medium, and side-surface portions 62 projecting backwardly from both the ends of said front surface portion, the side surface portions being freely-rotatably supported to the lid-support portion of the slider, and the front-end portions of the slider and the side-surface portions of the front lid have overlap portions 62c and 82b which are overlapped with each other in the right-and-left direction.

4 Claims, 25 Drawing Sheets

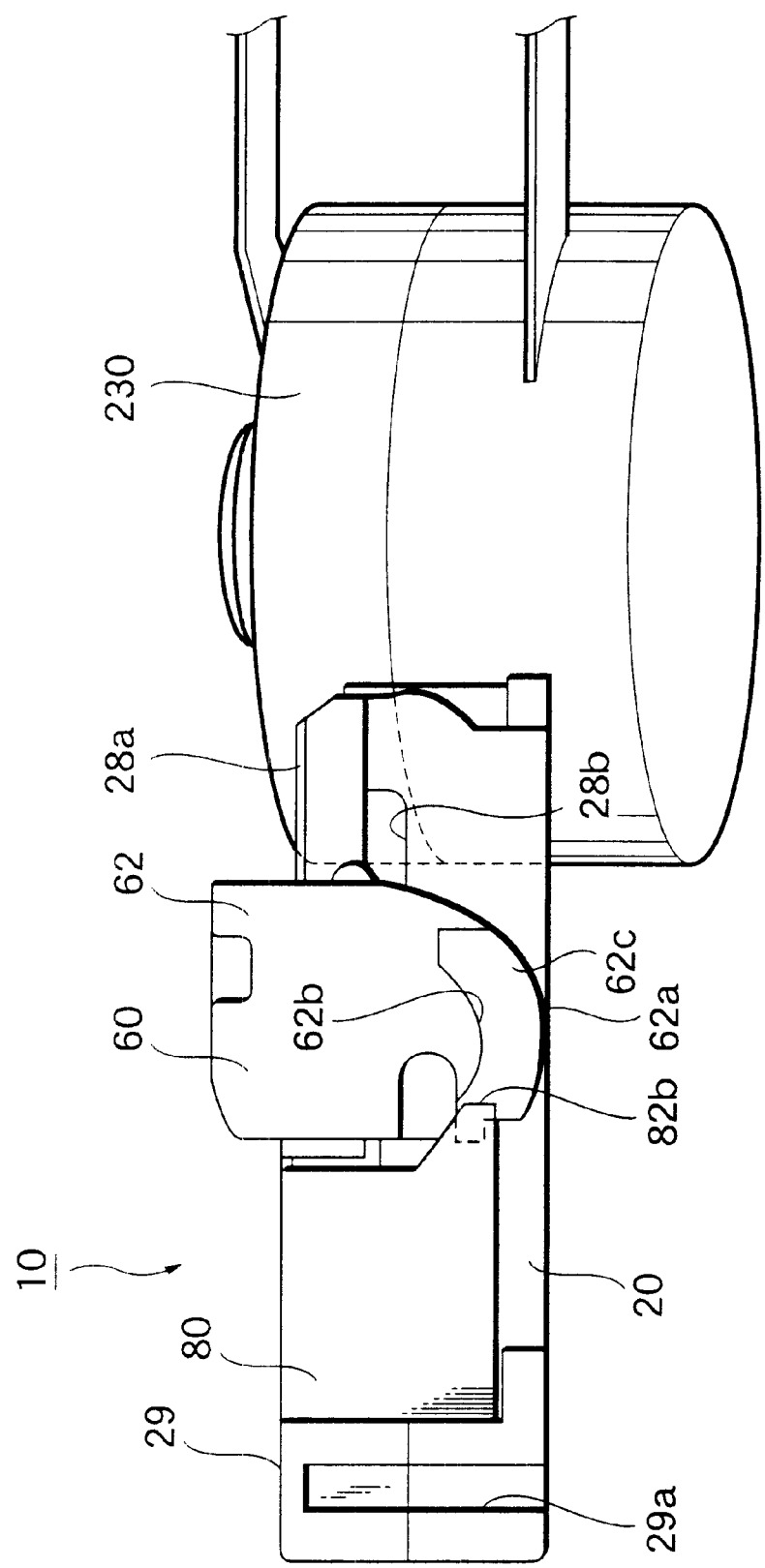

TAPE CASSETTE HAVING LID AND SLIDER OVERLAPPING PORTIONS

BACKGROUND OF THE INVENTION

1. Field of the Invention

The present invention relates to a novel tape cassette, and, more particularly, to an improvement in the structure of a tape cassette in which step portions formed on the side surface portions of the tape cassette can be made small and also a smooth opening/closing operation of the front lid can be performed.

2. Description of the Related Art

In connection with the enhancement of the recording density in a tape cassette field, there has been developed and known such a technique that a part of a tape-shaped recording medium exposed from a cassette shell to the outside is covered by a cover member called a "lid" when a tape cassette is not used, thereby preventing dusts, oil and other foreign matter from adhering to the exposed part of the tape-shaped recording medium.

In such a tape cassette in which a tape-shaped recording medium located so as to pass through the front side of a mouth portion that is provided to the front portion of a cassette shell and opened in forward and up-and-down directions is covered by a front lid at the front side thereof and the tape-shaped recording medium is exposed to the outside by rotating the front lid upwardly by substantially 90 degrees when the tape cassette is used, members to be arranged in the mouth portion suffer various restrictions when the tape cassette is used because the upper side of the mouth portion is closed by the front lid. Therefore, as a technique of solving this problem, a slider is equipped to the cassette shell so as to be freely movable forwardly and backwardly, the front lid is freely-rotatably mounted to the front-end portions of the slider, and the front lid is upwardly swung while the slider is backwardly moved when the lid is opened, thereby preventing the front lid from stopping at the upper side the mouth portion (see FIG. 26).

In such a case where a slider a is merely equipped to a cassette shell b so as to be freely movable forwardly and backwardly and the front lid c is merely freely-rotatably fixed to the front end portions of the slider a when the front lid is mounted on the slider, when the tape cassette d is required to be designed so that the distance between the front-end portions thereof is equal to the distance between the rear-end portions, that is, the lateral (e—e) width of the front lid c is set to be equal to the lateral width (f—f) of the rear face of the cassette shell b, a large step g occurs between each rear-end portion f of the cassette shell b and each slide surface portion of the cassette shell b along which the slider a is slid because each outer-side surface of the slider a is located farther inwardly than the side-surface portion e of the front lid c by an amount corresponding to at least the thickness of the side surface portion e of the front lid c.

When the tape cassette d thus constructed is inserted into a holder h to mount the tape cassetted at a predetermined mount position of a recording/reproducing apparatus, there would occur such an accident that step g is unintentionally hooked to a corner of the cassette entrance of the holder h or the like if the insertion orientation of the tape cassette is slightly inclined or the like (see FIG. 26).

SUMMARY OF THE INVENTION

Therefore, the present invention has an object to make small the steps of the side-surface portions of the tape cassette (i.e., reduce the height of the steps) and, also, to enable the opening/closing operation of the front lid to be smoothly carried out.

In order to solve the above problem, according to the tape cassette of the present invention, a slider is provided so as to be freely movable forwardly and downwardly; each side surface portion of the slider along the side surface of the front lid has a lid-support portion at the front-end portion thereof and a main-surface portion located outside of the lid-support portion; the front-lid has a front-surface portion covering the front surface of the tape-shaped recording medium and side-surface portions projecting backwardly from both the ends of the front-surface portion, the side surface portions being freely rotatably supported to the lid-support portion of the slider; and the front-end portions of the slider and the side-surface portions of the front lid have overlap portions which are overlapped with each other in the right-and-left direction.

Accordingly, in the tape cassette of the present invention, the main surface portions of the slider are located so as to be farther outwardly projected than the lid support portions thereof, and thus the corresponding slide portions of the side surfaces of the cassette shell along which the main surface portions of the slider are slid are located so as to be farther outwardly projected than those of the prior art. Therefore, the step occurring between each rear-end portion and each slide portion can be reduced. Further, the overlap portions are provided to the front-end portions of the main-surface portions of the slider and the side-surface portions of the front lid so as to be overlapped with each other in the right-and-left direction, Therefore, the overlap portions of the front lid are guided by the overlap portions of the slider during rotation of the front lid, so that the opening/closing operation of the front lid is smoothly carried out.

BRIEF DESCRIPTION OF THE DRAWINGS

FIG. 21 is a schematic side view showing a state which the tape cassette is mounted at a predetermined mount position of the recording/reproducing apparatus;

DETAILED DESCRIPTION OF THE PREFERRED EMBODIMENTS

Figure 1:
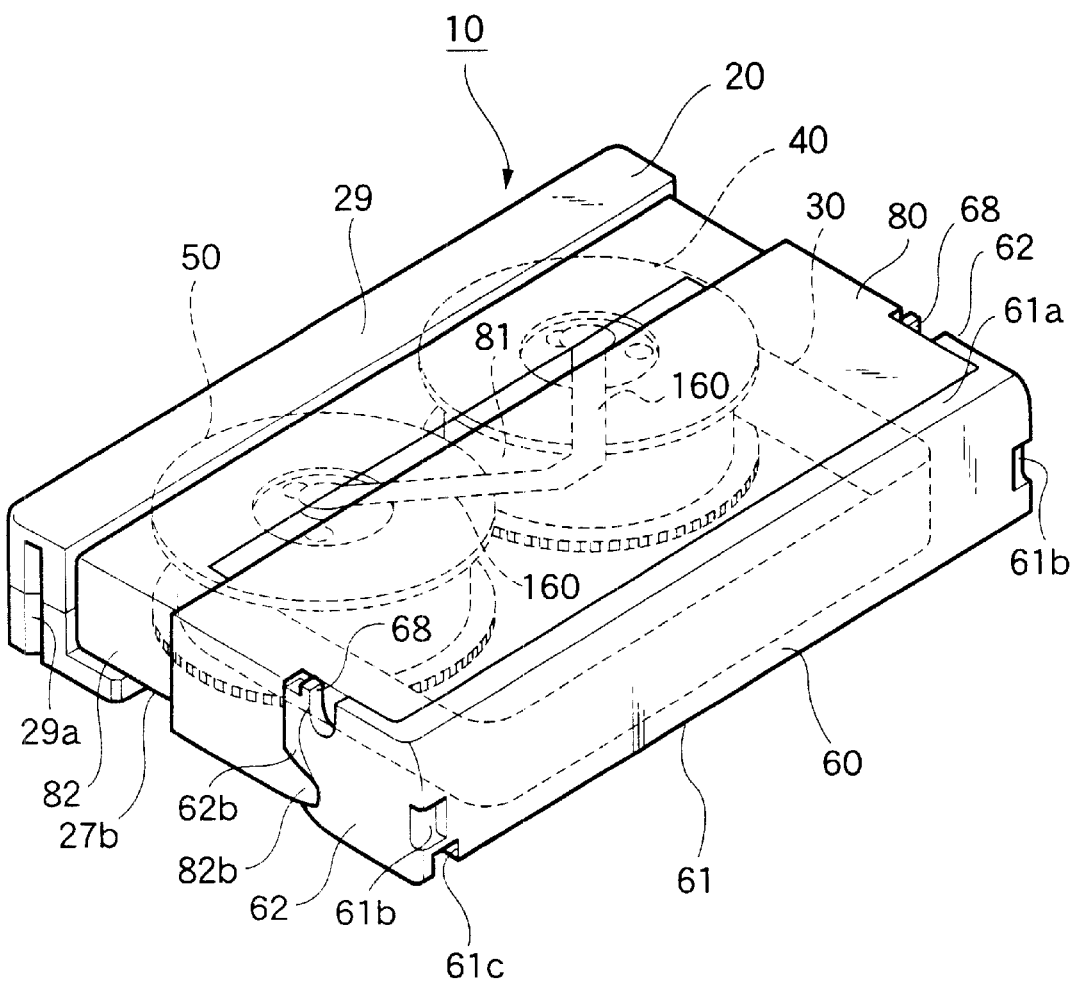
FIG. 1 shows an embodiment of a tape cassette of the present invention together with FIGS. 2 to 25 and also is a perspective view showing a state where a front lid is set to a lid-closed state.
Figure 2:
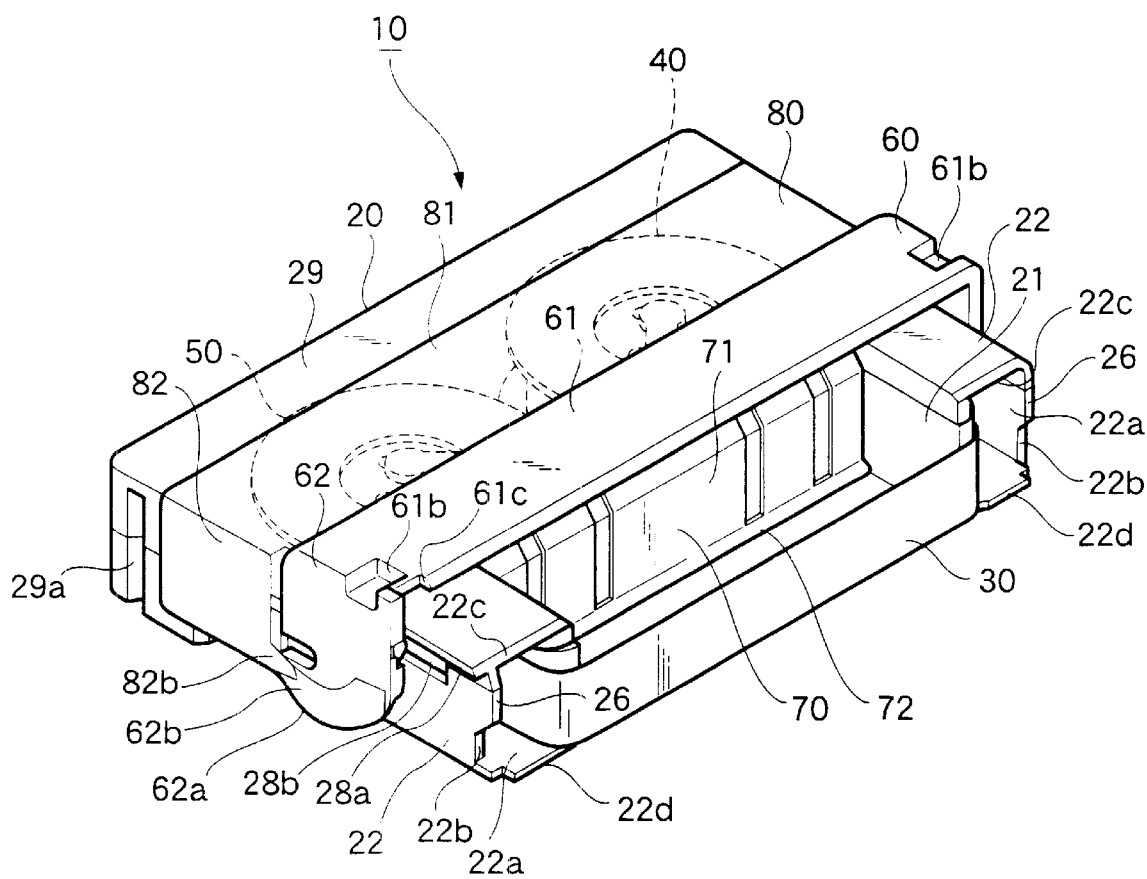
FIG. 2 is a perspective view showing the state in which a front lid and a back lid are located at a lid-opening position.

Preferred embodiments of a tape cassette according to the present invention will be described with reference to the accompanying drawings.

In a cassette tape 10, tape reels 40 and 50 around which a magnetic tape 30 serving as a tape-shaped recording medium is wound are rotatably accommodated in a thin box-shaped cassette shell 20. The cassette tape 10 includes a front lid 60 for covering the front-surface side of the magnetic tape 30 located along the front face of the cassette shell 20 and a back lid 70 for covering the back side of the magnetic tape 30. The back lid 70 is formed integrally with a slider that is mounted on the cassette shell 20 so as to be freely movable in the forward/backward direction, and the front lid 60 is freely-rotatably mounted on the slider 80.

The cassette shell 20 is designed as a thin box type and formed so that the overall body thereof or a portion through which the tape reels 40 and 50 are viewed is transparent.

A large recess portion 21 called as a mouth portion is formed at the front portion of the cassette shell 20. The mouth portion 21 is opened forward, upwardly and downwardly.

Recess stripes 21a each extending in the up-and-down direction are formed on the back face of the mouth portion 21 so as to avoid the positions facing the maximum outer diameter portions of the tape reels 40 and 50 disposed in the cassette shell 20.

The portions at both sides of the mouth portion 21 of the cassette shell 20 are set as tape drawing portions 22 each having a shape like a hollow prism, and the front ends 22a of the tape-drawing portions 22 are opened. The magnetic tape 30 is drawn from the openings 22a of the tape-drawing portions 22 and runs between the openings 22a so as to traverse the front face of the mouth portion 21.

Two reel-stand insertion ports 23 are juxtaposed at the right and left sides on the bottom-surface wall of the cassette shell 20, and fitting holes (not show) of the tape reels 40 and 50 are formed so as to downwardly face through the reel-stand insertion ports 23. When the tape cassette 10 is loaded into a recording/reproducing apparatus (not shown), reel stands provided to the recording/reproducing apparatus are inserted from the reel-stand insertion ports 23 into the cassette shell 20, so that reel-fitting shafts provided to the reel stands are fitted into the fitting holes of the tape reels 40 and 50 and the tape reels 40 and 50 are mounted on the reel stands.

Two reel-lock members 90 are disposed at the rear portion in the cassette shell 20, and when the tape cassette is unused, the pawls 91 of the reel-lock members 90 are engaged with engaging projections 41 and 51 formed on lower flanges of the tape reels 40 and 50 to lock the tape reels 40 and 50, so that the tape reels 40 and 50 are not arbitrarily rotated. The reel-lock members 90 are urged by springs (not shown) so as to lock the tape reels 40 and 50. When the tape cassette 10 is loaded into the recording/reproducing apparatus (not shown), a lock-release pin provided in the recording/reproducing apparatus is inserted from an insertion port 24 formed on the bottom surface of the cassette shell 20 to rotate the reel-lock members 90 in such a direction as to release the lock, whereby the lock to the tape reels 40 and 50 is released.

A light-shielding barrel 25 is formed at the inside of the center in the right-and-left direction of the back face of the mouth portion 21 of the cassette shell 20. The light-shielding barrel 25 has an opening 25a in the lower surface thereof and notches 25b at the right and left sides thereof.

Light-transmissible holes 25c are formed so as to be slightly nearer to the front ends of the side-surface walls of the cassette shell 20 than the center of each side-surface wall of the cassette shell 20, so that the notches 25b of the light-shielding barrel 25 can be viewed from the light-transmissible holes 25c.

Cam portions 26 which project forwardly are formed substantially at the upper-half portion of the portions 22b located at the outside of the front-end faces of the tape-drawing portions 22. The front-end faces 22b are a bit farther backward than the other three front-end faces, and the front-end faces 22b and the upper and lower front-end faces 22c and 22d are set as advance stoppers which abut against stoppers provided in a cassette holder to regulate the insertion limit of the tape cassette 10 into a cassette holder (not shown) when the tape cassette 10 is inserted into the cassette holder.

Further, in-cassette guides 22e each having a semi-cylindrical shape are formed so as to be located on the inner surfaces which are inside of the tape-drawing portions 22 and adjacent to the openings 22a. The magnetic tape 30 under the non-use state is tensely suspended between the tape-drawing portions 22 while wound around the in-cassette guides 22e.

A downwardly-facing step portion 27a extending in the forward/backward direction is formed so as to be nearer to the lower end in the substantially latter-half portion of one side surface of the cassette shell 20, that is, the right-side surface as being viewed from the front face of the cassette shell 20, and also a downwardly-facing step portion 27b is formed so as to be nearer to the lower end in the second half portion of the left-side surface of the cassette shell 20. These step portions 27a and 27b are designed to have grooves at the inner-end portions thereof.

The substantially first-half portions on the side surfaces of the cassette shell 20 are designed to be recessed inwardly as compared with the latter-half portions, and the recess degree is set to be larger at the left-side than the right-side, and an overhang portion 28a extending outwardly is formed at the upper end of the left first-half portion.

Further, slide grooves 28b are formed in the vicinity of the upper ends of both the side surfaces so as to extend from the front-end portions to the light-transmissible holes 25c.

Further, projecting portions 29 extending in the right-and-left direction and in the upward direction are formed at the rear-end portion of the cassette shell 20, and grooves 29a are formed on both the right and left-side surfaces of the projecting portions 29 so as to extend from the vicinity of the upper end of the projecting portions 29 to the lower end thereof. In addition, projections 29b are formed so as to extend slightly forward from the lower ends of the projecting portions 29, and an extremely slight gap is formed between the upper end of each projection 29b and each step portion 27b.

The cassette shell 20 is constructed by butting an upper shell 100 and a lower shell 110 from the upper and lower sides. The elements described above are shared to the upper shell 100 and the lower shell 110 or formed by coupling the upper shell 100 and the lower shell 110.

The upper shell 100 is integrally formed with an upper-surface portion 101 serving as the whole portion of the upper surface of the cassette shell 20, a back-surface portion 102 serving as the upper-half portion of the rear surface of the cassette shell 20, side-surface rear portions 103 serving as most of the side-surface of the cassette shell 20 except for the lower-end portion of the substantially rear-half portion, side-surface front portions 104l (left) and 104r (right) serving as the upper-end portion of the residual portion of the side-surface of the cassette shell 20, and the front surface of the cassette shell, that is, the front portions 105, serving as portions excluding the lower-end portions of both the side portions excluding the central portion of the back surface of the mouth portion 21. The side-surface front portions 104l and 104r are a bit farther inward than the side-surface rear portions 103, and the side-surface front portion 104l at the left-side is formed at a bit farther inward position than the side edge of the upper-surface portion 101, thereby forming a hang-over portion 28a.

The lower shell 110 is integrally formed with a bottom-surface portion 111 serving as the whole portion of the bottom surface of the cassette shell 20, a rear-surface portion 112 serving as the lower-half portion of the rear surface of the cassette shell 20, side-surface rear portions 113 serving as the lower-end portions of the substantially rear-half portions of the side surfaces, of the cassette shell 20, side-surface front portions 114 serving as the portions obtained by excluding the upper-end portions from the residual portions of the side surfaces of the cassette shell 20, the front surface of the cassette shell 20, that is, a front surface central portion 115, serving as the central portion of the back surface of the mouth portion 21, front-surface side portions 116, 116 serving as the lower-end portions of both the side portions of the mouth portion 21 and inner-side surface portions 117 serving as the inner-side surface portions of the tape drawing portions 22.

The portions 113a obtained by excluding the lower-end portions of the projecting portions 29 from the side-surface rear portions 113 are farther inward than the side-surface portions 103 of the upper shell 100 to form slight gaps between these portions and the side-surface rear portions 103, so that the lower-end portions of the gaps serve as grooves at the inner end portions of the step portions 27a and 27b.

Notches 114a are formed at the rear-end portions of the side-surface front portion 114 so as to be opened to the upper ends thereof, and shallow recess portions 114b are formed at the portions obtained by excluding the front-end portions of the portions near to the upper ends from the outer surfaces of the side-surface front portions 114. Further, shallow recess portions 114c are formed at the portions obtained by excluding the front-end portions of the upper-end portions of the recess portions 114b.

The recess stripes 21a at the back surface of the mouth portion 21 are formed at the front-surface portions 105 of the upper shell 100 and at the front-surface side portions 116 of the lower shell 110. The reel-stand insertion ports 23, the insertion port 24 and the light-shielding barrel 25 are formed on the bottom-surface portion 111 of the lower shell 110, and the cam portions 26 are formed at the front-end portions of the side-surface front portions 114 of the lower shell 110.

The step portions 27a are formed by the lower ends of the side-surface rear portions 103 of the upper shell 100.

Further, the slide grooves 28b are formed by the side-surface front portions 104l and 104r of the upper shell 100 and the recess portions 114b formed at the upper-end portions of the side-surface front portions 114 of the lower shell 110. Slight gaps are formed between the side-surface front portions 104l and 104r of the upper shell 100 and the upper-end portions of the side-surface front portions 114 of the lower shell 110 by the recess portions 114c.

The projecting portion 29 are formed over the upper surface portion 101 and the side-surface rear portions 103 of the upper shell 100 and the side-surface rear portions 113 of the lower shell 110.

The upper ends of the notches 114a formed at the side-surface front portions 114 of the lower shell 110 are closed by the upper shell 100 to thereby form the light-transmissible holes 25c.

The upper shell 100 and the lower shell 110 are butted against each other from the upper and lower sides and coupled to each other by screws 120 to form the cassette shell 20.

The slider 80 is formed of a thin metal plate, preferably a metal plate having conductivity. The slider 80 is constructed by integrally forming an upper-surface portion 81 having a planar shape elongated in the right-and-left direction with side-surface portions 82 which are downwardly projected from the right and left-side edges of the upper surface portion 81. The side surface portions comprise main-surface portions 82 extending from a slightly farther forward position than the center in the forward/backward direction to the rear-ends and lid-support portions 83 at the front side of the main-surface portions 82.

The lid-support portions 83 are a bit farther inward than the main surface portions, and the width thereof in the up-and-down direction is substantially half the width of the main-surface portions 82. Further, substantially semicircular shaft-holding portions 83a opened downwardly are formed in the lid-support portions 83, and slide projections 83b and 83c projecting inwardly are formed at the lower edges of the rear-end portions of the lid-support portions 83. The slide projections 83b and 83c are formed so that the slide projection 83b at the left side as being viewed from the front side is longer than the slide projection 83c at the right side as being viewed from the front side, and the tip portions 83b' and 83c' of the respective slide projections are upwardly bent.

The lower-end portions of the main-surface portions 82 are inwardly folded to form sliding fitting portions 82a which are U-shaped in section. Further, overlap portions 82b are formed so as to project from the lower-end portions of the front-end edges of the main-surface portions 82 forwardly and slightly downwardly.

A back lid 70 is integrally formed with the slider 80. The upper-end edge of the back lid 70 is integrally formed with the front edge of the upper-surface portion 81 of the slider 80. The back lid 70 is constructed by a main portion 71 extending vertically and having the same width in the right-and-left direction as the mouth portion 21 and a lower-end closing portion 72 which extends from the lower-end edge of the main portion 71 forwardly and slightly downwardly. The lower-end closing portion 72 is folded from the back side, that is, the rear side. By forming the folded portion 72a, a sharp edge is prevented from being formed at the lower end of the lower-end closing portion 72. Since there is no sharp edge, as described above, the magnetic tape 30 and the members at the recording/reproducing apparatus side, such as a pinch roller, etc., can be prevented from being damaged.

The slider 80 is mounted in the cassette shell 20 so as to be freely slidable in the forward/backward direction as follows.

The slider 80 is backwardly slid while the main portion 81 of the slider 80 is mounted on the front-end portion of the upper-surface portion 101 of the upper shell 100. The slide-fitting portions 82a of the slider 80 are freely slidably fitted to the lower edges of the side-surface rear portions 103 of the upper shell 100. Further, the slide projections 83b and 83c of the slider 80 are located at the lower sides of the side-surface front portions 104l and 104r of the upper shell 100, and the upwardly-bent tip portions 83b' and 83c' are allowed to be fitted to the inner surfaces of the side-surface front portions 104l and 104r.

Therefore, when the lower shell 110 and the upper shell 100 are coupled to each other, the slide projections 83b and 83c of the slider 80 are freely slidably located at the upper-end portions of the sliding grooves 28b which are elongated in the forward/backward direction and formed by the side-surface front portions 104l and 104r of the upper shell 100 and the recess portions 114b of the lower shell 110, that is, at the positions corresponding to the lower-end portions of the recess portions 114c, and the upwardly-bent tip portions 83b' and 83c ' of the slide projections 83b and 83c are located in the gaps between the side-surface front portions 104l and 104r of the upper shell 100 and the recess portions 114c of the lower shell 110, whereby the slider 80 is mounted in the cassette shell 20 so as to be freely slidable in the forward/backward direction. The rear-end of the sliding range of the slider 80 corresponds to the position at which the rear end of the upper-surface portion 81 of the slider 80 abuts against the projection 29 of the cassette shell 20, and the front end thereof corresponds to the position at which a rotational support shaft of the front lid 60 mounted on the slider 80, as described later, abuts against the front ends of the sliding grooves 28b.

The front lid 60 is freely rotatably supported on the lid-support portions 83 provided to the front-end portion of the slider 80.

The front lid 60 is constructed by forming a front surface portion 61 elongated substantially in the right-and-left direction integrally with side-surface portions 62 projecting backward from the right and left-end edges of the front-surface portion 61. The upper-end portion 61a of the front-surface portion 61 is gently bent so as to be displaced backward as it extends upwardly.

Thick portions 63 are formed so as to be brought into contact with the joint portions with the front-surface portion 61 on the inner surfaces of the side-surface portions 62, and regulating faces 64 each having an arcuate face as being viewed from the side are formed at the thick portions 63. Rotational-support shafts 65 and 66 are projectingly formed substantially at the center portions of the inner surfaces of the side surface portions 62 so as to confront the regulating faces 64. Further, annular grooves 65a and 66a are formed at the base portions of the rotational support shafts 65 and 66. The left rotational-support shaft 65 is provided with the annular groove 65a, a large-diameter portion 65b and a small-diameter portion, which are linked to one another in this order, and the overall length is set to be larger than that of the right rotational-support shaft 66. The regulating faces 64 are formed to have arcuate faces with each of the rotational-support shafts 65 and 66 at the center thereof.

The rear-edge portions 62a of the side-surface portions 62 are formed to have an arcuate shape with the rotational-support shafts 65 and 66 at the center thereof, arcuate and shallow recess portions 62b are formed at the portions corresponding to the rear edges 62a on the outer surfaces of the side-surfaces 62, and the portions 62c in which the recess portions 62b are formed are set as the overlap portions.

A recess portion 62d is formed at the lower-end portion on the inner surface of the side-surface portion 62 at the left side so as to be downwardly opened.

A support shaft 67 is projectingly provided at a position which is away from the rotational support shaft 65 of the inner surface of the left-side surface portion 62 in the lower backward direction.

Further, light-transmissible notches 68 are formed to be near to the rear-end portions of the upper edges of the side-surface portions 62.

Still further, fitting recess portions 61b, which are opened in the front and side directions, are formed to be near to the lower-ends of both the ends of the front-surface portions as being viewed from the front side, and an insertion notch 61c is formed to be near to the left end of the lower edge of the front-surface portion 61.

The annular grooves 65a and 66a of the rotational-support shafts 65 and 66 of the front lid 60 are rotatably fitted to the shaft-holding portions 82a of the slider 80, whereby the front lid 60 is rotatably supported on the lid-support portions 83 of the front-end portion of the slider 80. The overlap portions 82b formed on the main-surface portions 82 of the slider 80 are freely slidably located in the recess portions 62b of the side-surface portions of the front lid 60, whereby the outer surfaces of the main-surface portions 82 of the slider 80 and the outer surfaces of the side-surface portions 62 of the front lid 60 are located within the same planes, that is, they are kept under the in-plane state.

A lid-lock member 130 is mounted inside the side surface portion 62 at the left-side of the front lid 60 as being viewed from the front side. The lid-lock member 130 is formed so as to be elongated as a whole, and a support hole 131 is formed at the center portion of the lid-lock member 130. A support shaft 67 which is formed in the side-surface portion 62 at the left-side of the front lid 60 as being viewed from the front side is inserted through the support hole 131, whereby the lid-lock member 130 is freely-rotatably supported by the side surface portion 62.

Figure 14:
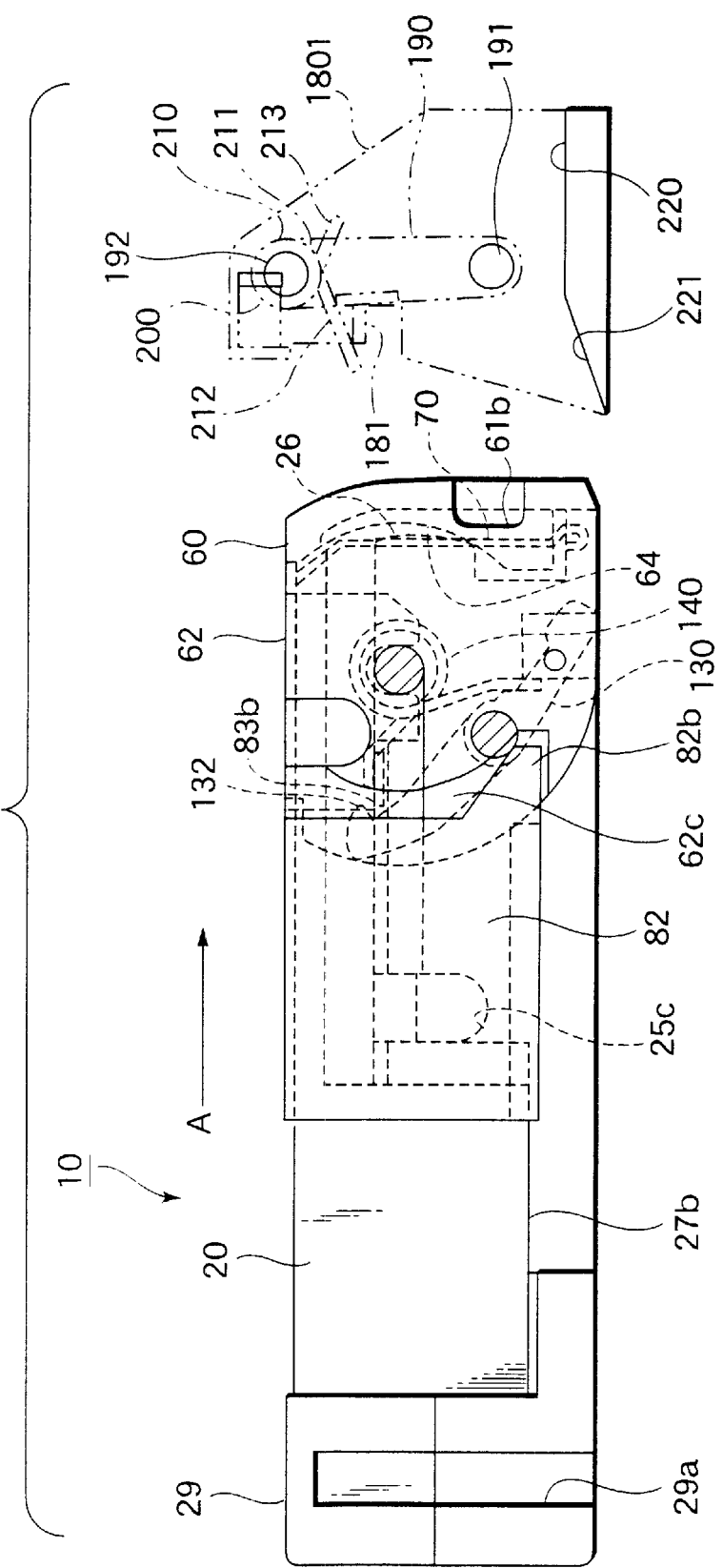
FIG. 14 is a schematic notched side view of the main part in a state where the tape cassette is started to be inserted into the cassette holder.
Figure 15:
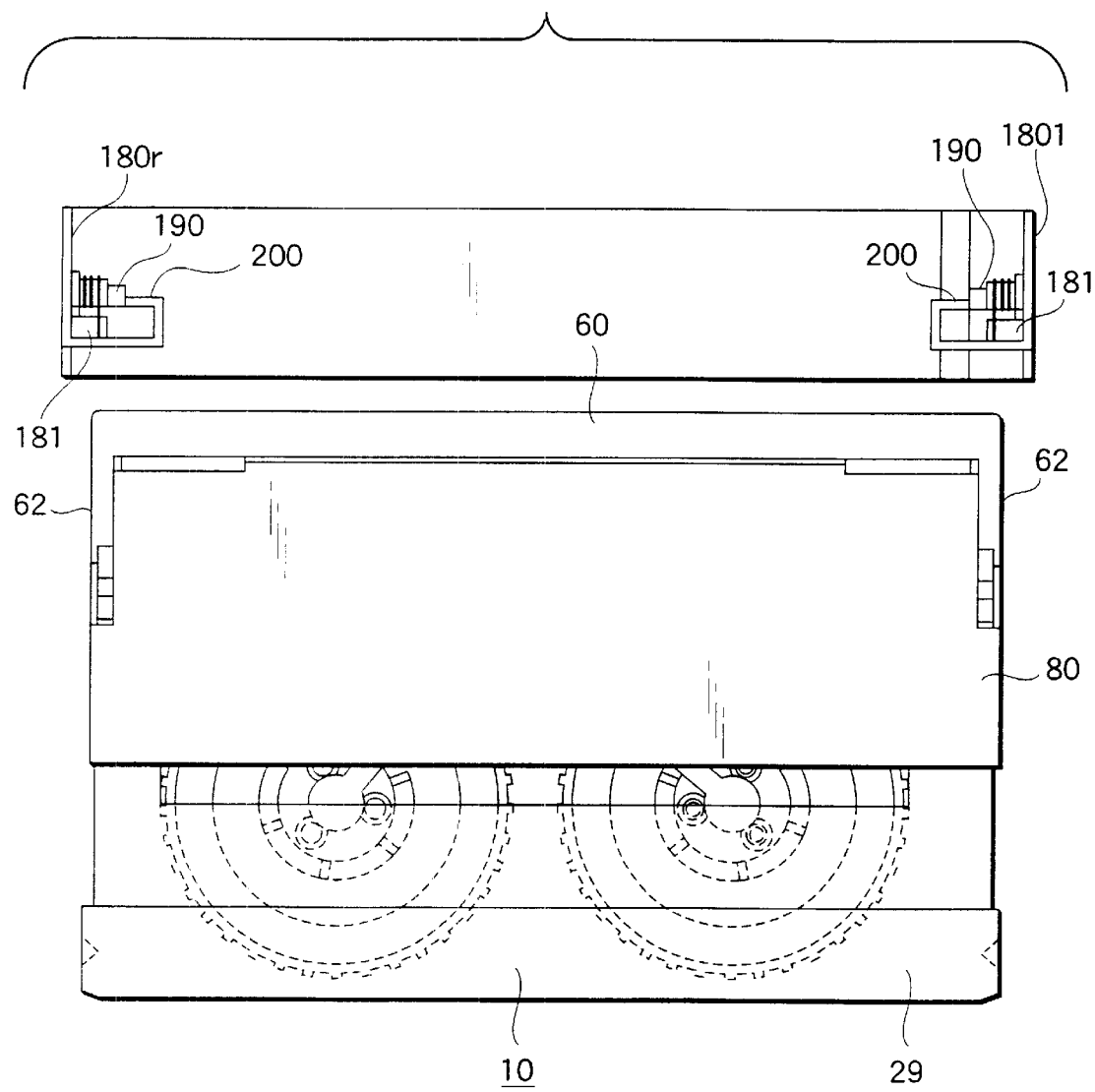
FIG. 15 is a schematic plan view showing the state which the tape cassette is started to be inserted into the cassette holder.

When the lid-lock member 130 is oriented in the lower right direction as being viewed from the left side (see FIG. 14), a hook pawl 132 projecting forward is formed at the upper-end portion so as to be hooked to the upper surface of the slide projection 83b formed on the lid-support portion 83 at the left side of the slider 80 as being viewed from the front side. A spring-hook face 133 is formed at the portion between the support hole 131 and the lower-end by notching the face opposite to the face corresponding to the side surface portion 62. Further, the portion 134 at the front side of the lower-end surface is designed to have an arcuate surface. A lock pin 135 is projectingly formed on the left surface of the portion near to the lower end, that is, the surface confronting the side-surface portion 62 of the front lid 60. The lock pin 135 is located in the recess portion 62d formed in the side-surface portion 62 at the left side of the front lid 60.

By providing a torsion-coil spring 140, each of the front lid 60 and the lid-lock member 130 is urged in a predetermined direction.

The coil portion 141 of the torsion-coil spring 140 is fitted on the outer periphery of the large-diameter portion 65b of the rotational-support shaft 65 formed at the left-side surface portion of the front lid 60, and one arm piece 142 is brought into elastic contact with the upper surface of the slide projection 83b formed on the lid-support portion 83 at the left side of the slider 80. The other arm piece 143 is brought into elastic contact with the spring-hook face 133 of the lid-lock member 130 (see FIG. 14), whereby the lid-lock member 130 is urged in the clockwise direction as being viewed from the left side, and the front lid 60 is urged in the clockwise direction as being viewed from the left side through the lid-lock member 130 and the support shaft 67, that is, it is urged so as to close the front side of the mouth portion 21 by the front-surface portion 61.

Since the lid-lock member 130 and the torsion-coil spring 140 are located at the inner sides of the side-surface portions 62 of the front lid 60, as described above, and since the lid-lock member 130 and the torsion-coil spring 140 are not exposed to the outside even when the lid-lock member 130 is rotated, thus it is impossible to touch the lid-lock member 130 and the torsion-coil spring 140 with a finger or remove them unless the slider 80 is detached from the cassette shell 20. Further, even when the front lid 60 is rotated, the lid-lock member 130 is not exposed to the outside. Further, the lid-lock member 130 locks the front lid 60 not to open. However, the front lid 60 and the slider 80 are pressed by the force of the torsion-coil spring 140, and thus it absorbs the backlash of the front lid 60 and the slider 80.

An in-cassette memory 150 is accommodated in a memory-accommodating groove 118 formed at the right-rear-end portion of the lower shell 110. The in-cassette memory 150 is designed so that a memory element 152 is mounted at the central portion of a laterally-elongated rectangular board 151, and a communication antenna 153 is spirally formed with a conductive pattern on the front and back surfaces of the board 151. The in-cassette memory 150 is communicated with the outside through the antenna 153, and the type of the magnetic tape, data of recording contents, etc. are recorded therein.

One end portions of the reel- press springs 160 are fixed to the lower surface of the upper-surface portion 101 of the upper shell 100, and the upper end centers of the tape reels 40 and 50 are pressed by the other end portions of the reel press springs 160 to press the reels 40 and 50 against the bottom-surface portion 111 of the lower shell 110.

The fabrication of the tape cassette described above is performed in the following procedure. First, there are formed three units of a lower-shell unit having the respective members fabricated in the lower shell 110, an upper-shell unit having the respective members fabricated in the upper shell 100 and slider unit in which the front lid 60 having the lid-lock member 130, etc fabricated in the slider 80 is fabricated, then the slider unit is fabricated in the upper shell unit, and finally the upper-shell unit having the slider unit fabricated therein and the lower shell unit are coupled to each other.

Figure 3:
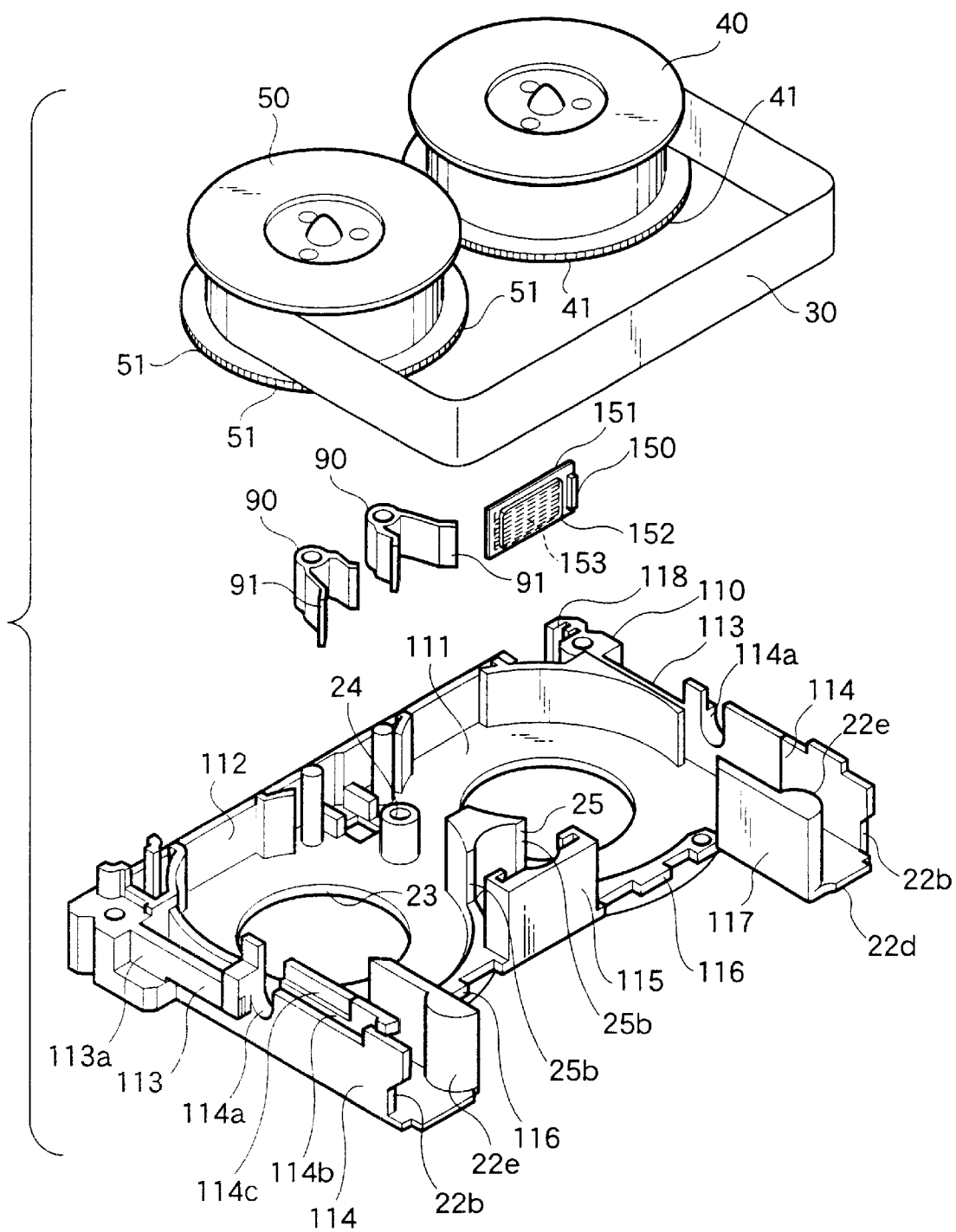
FIG. 3 is an exploded perspective view showing a lower-shell unit.
Figure 4:
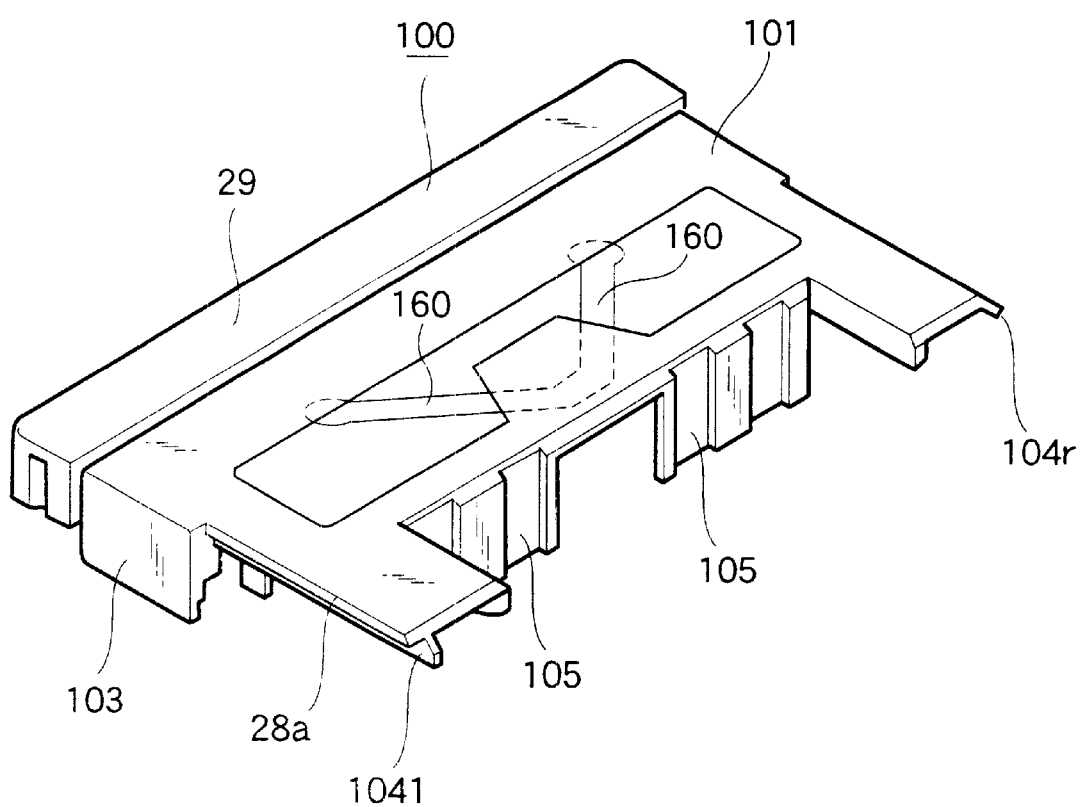
FIG. 4 is a perspective view showing an upper-shell unit.
Figure 5:
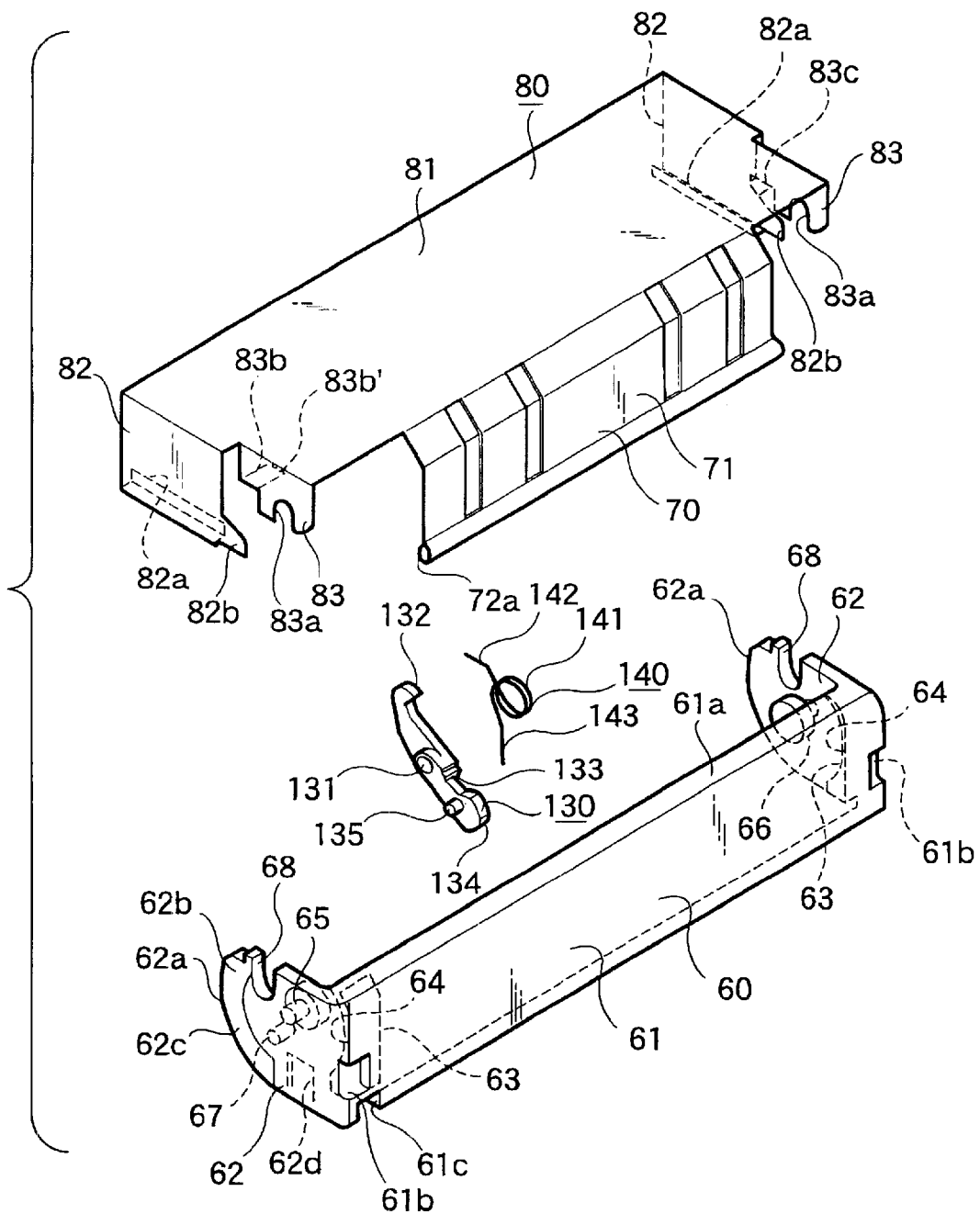
FIG. 5 is an exploded perspective view showing a slider unit.
Figure 7:
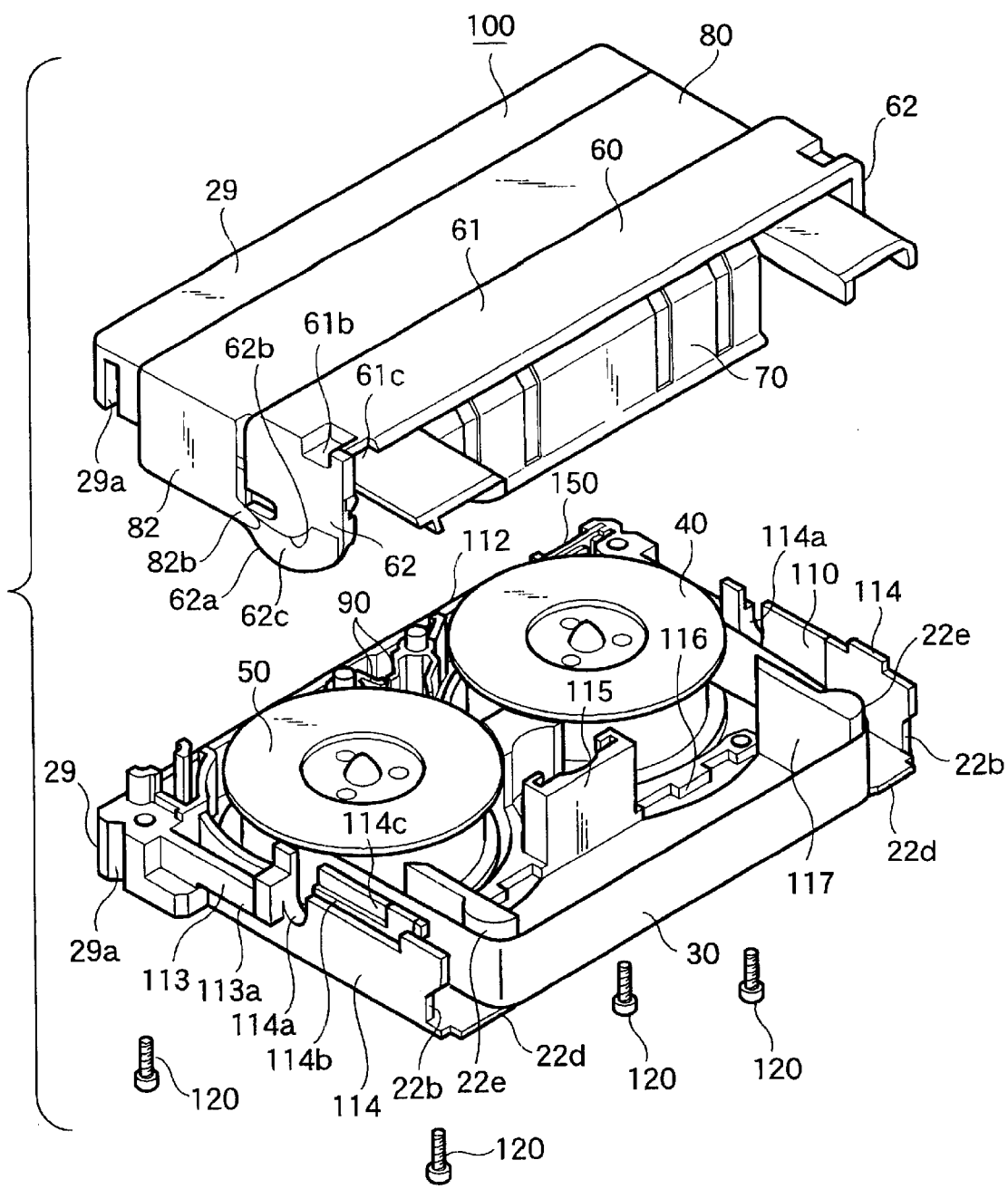
FIG. 7 is a perspective view showing the upper-shell unit having the slider unit fabricated therein and the lower-shell unit while they are separated from each other.
Figure 8:
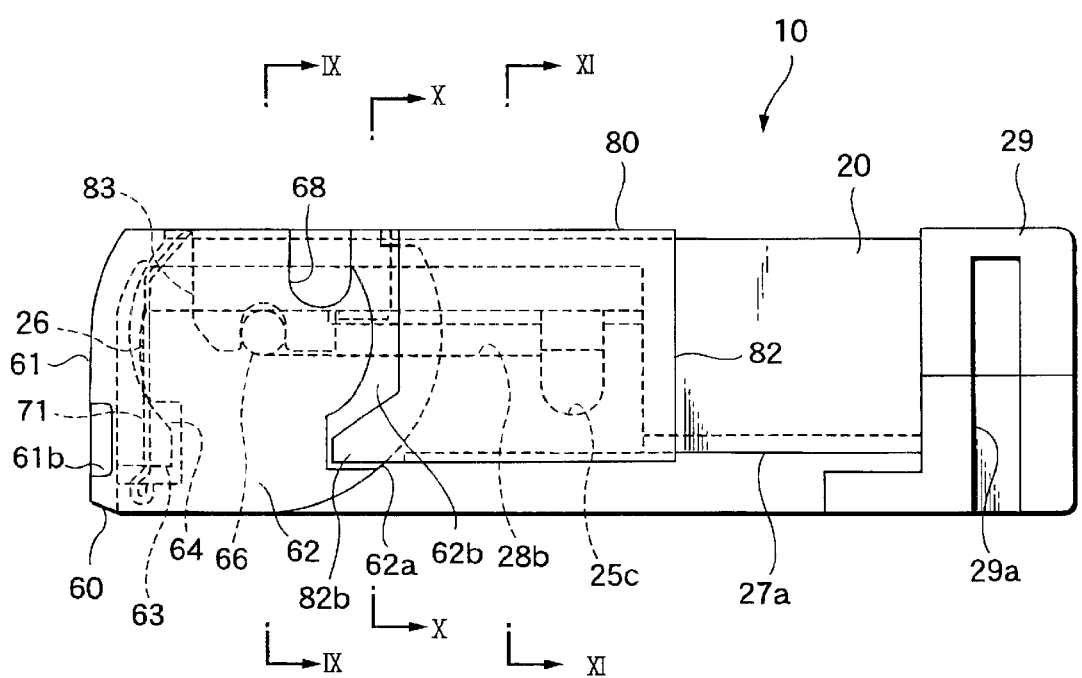
FIG. 8 is a right-side view of a tape cassette.
Figure 9A:
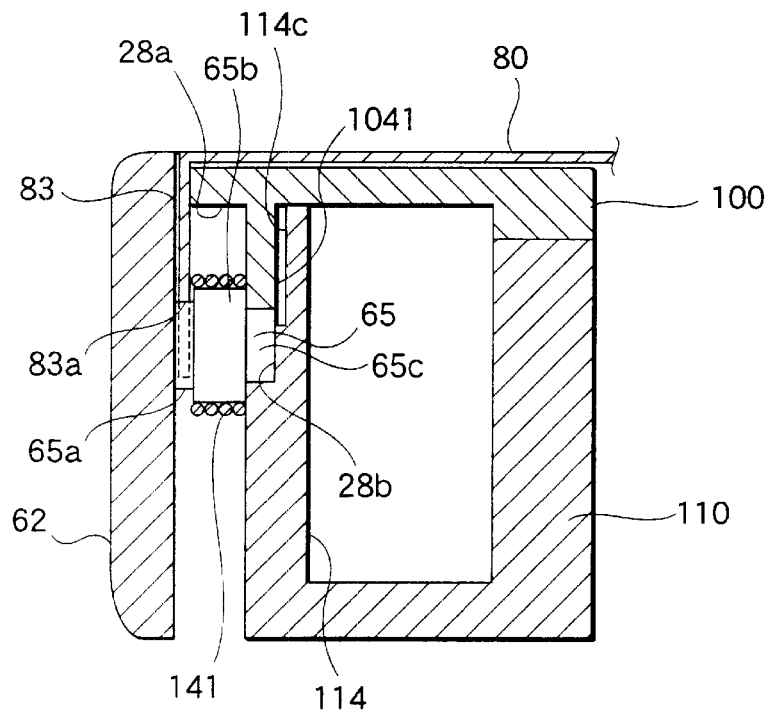
FIGS. 9A and 9B are enlarged sectional views along the IX—IX line of FIG. 8, which respectively show a left-end portion and a right-end portion.
Figure 9B:
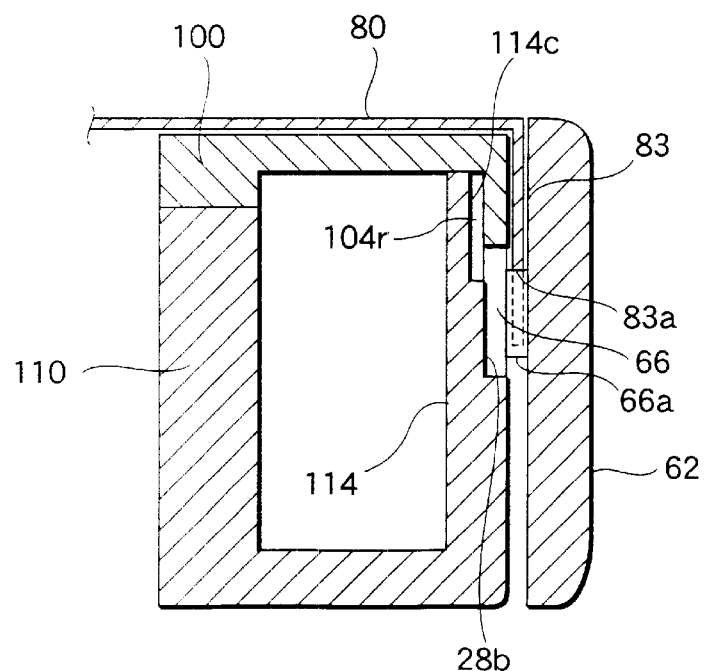
Figure 10A:
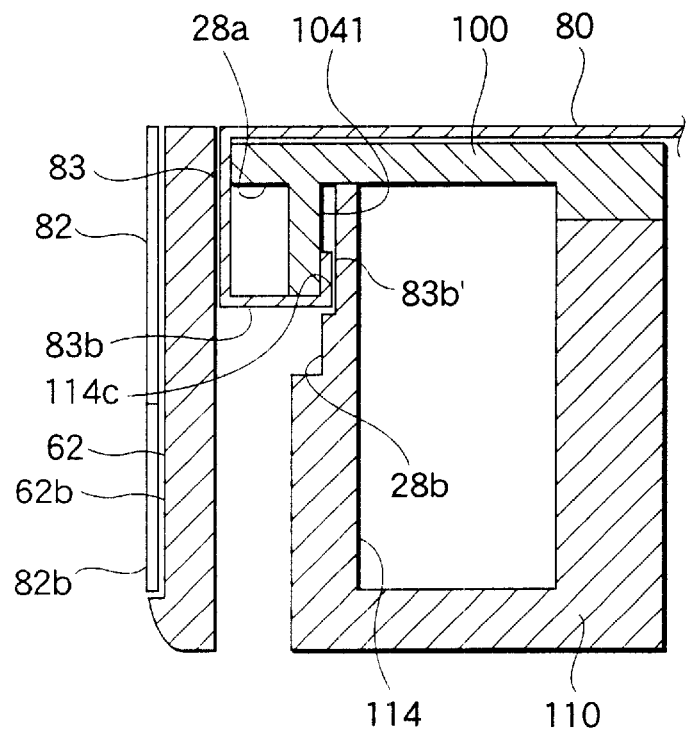
FIGS. 10A and 10B are enlarged sectional views along the X—X line of FIG. 8, which respectively show the left-end portion and the right-end portion of the tape cassette.
Figure 10B:
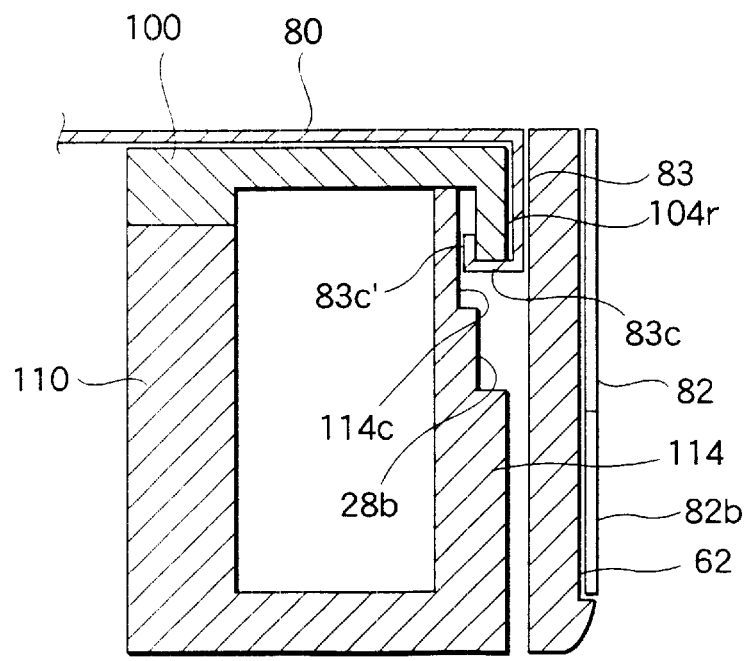
Figure 11A:
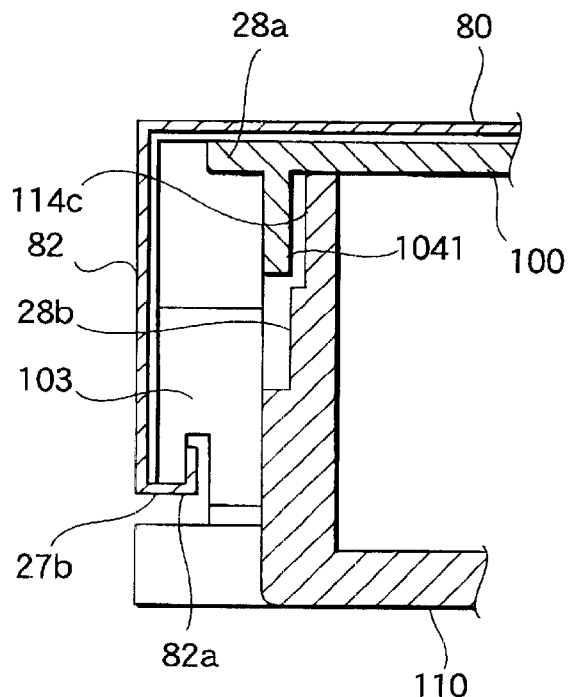
FIGS. 11A and 11B are enlarged sectional views along the XI—XI line of FIG. 8, which respectively show the left-end portion and the right-end portion of the tape cassette.
Figure 11B:
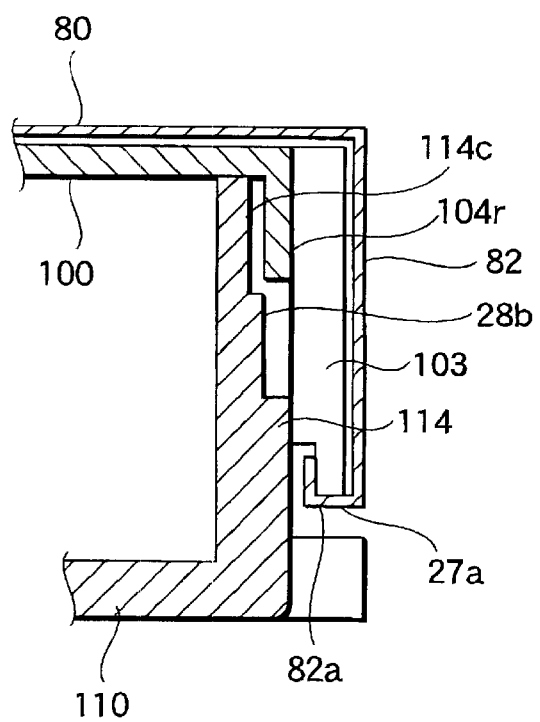
Figure 12:
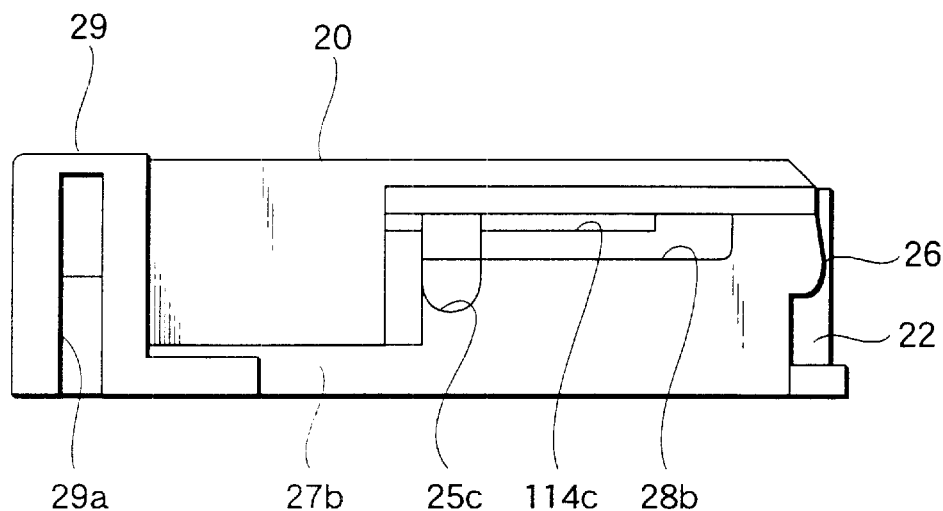
FIG. 12 is a left-side view of the cassette shell.
Figure 13:
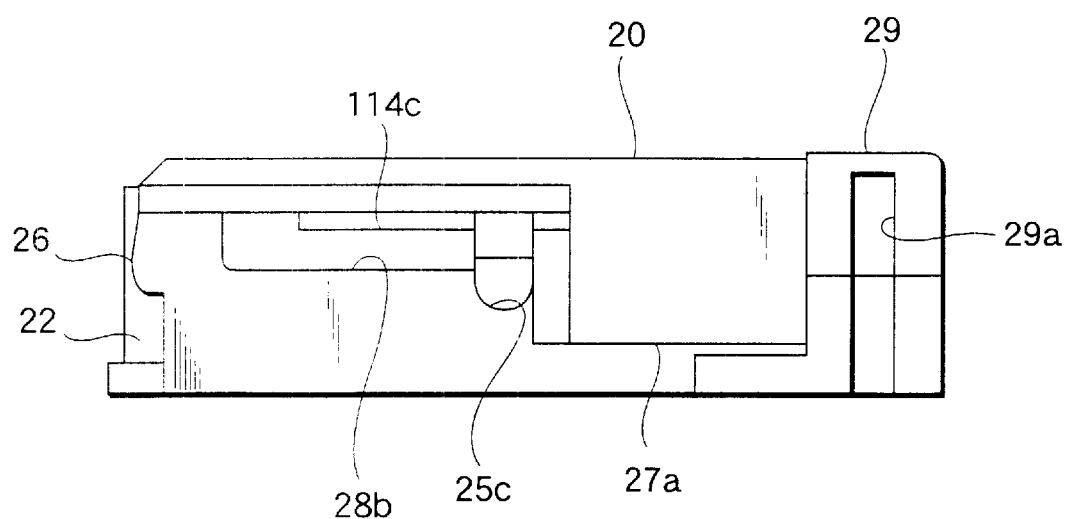
FIG. 13 is a right-side view showing the cassette shell.

The lower-shell unit is formed by fabricating into the lower shell 110 the tape pulleys 40 and 50 around which the magnetic tape 30 is wound, the reel-lock members 90, the in-cassette memory , etc. (see FIG. 3 and FIG. 7). The upper-shell unit is formed by fabricating the reel-press springs 160 into the upper shell 100 (see FIG. 4). The slider unit is formed by supporting on the slider 80 the front lid 60 having the lid-lock member 130 and the torsion coil spring 140 fabricated therein (see FIG. 5).

Figure 6:
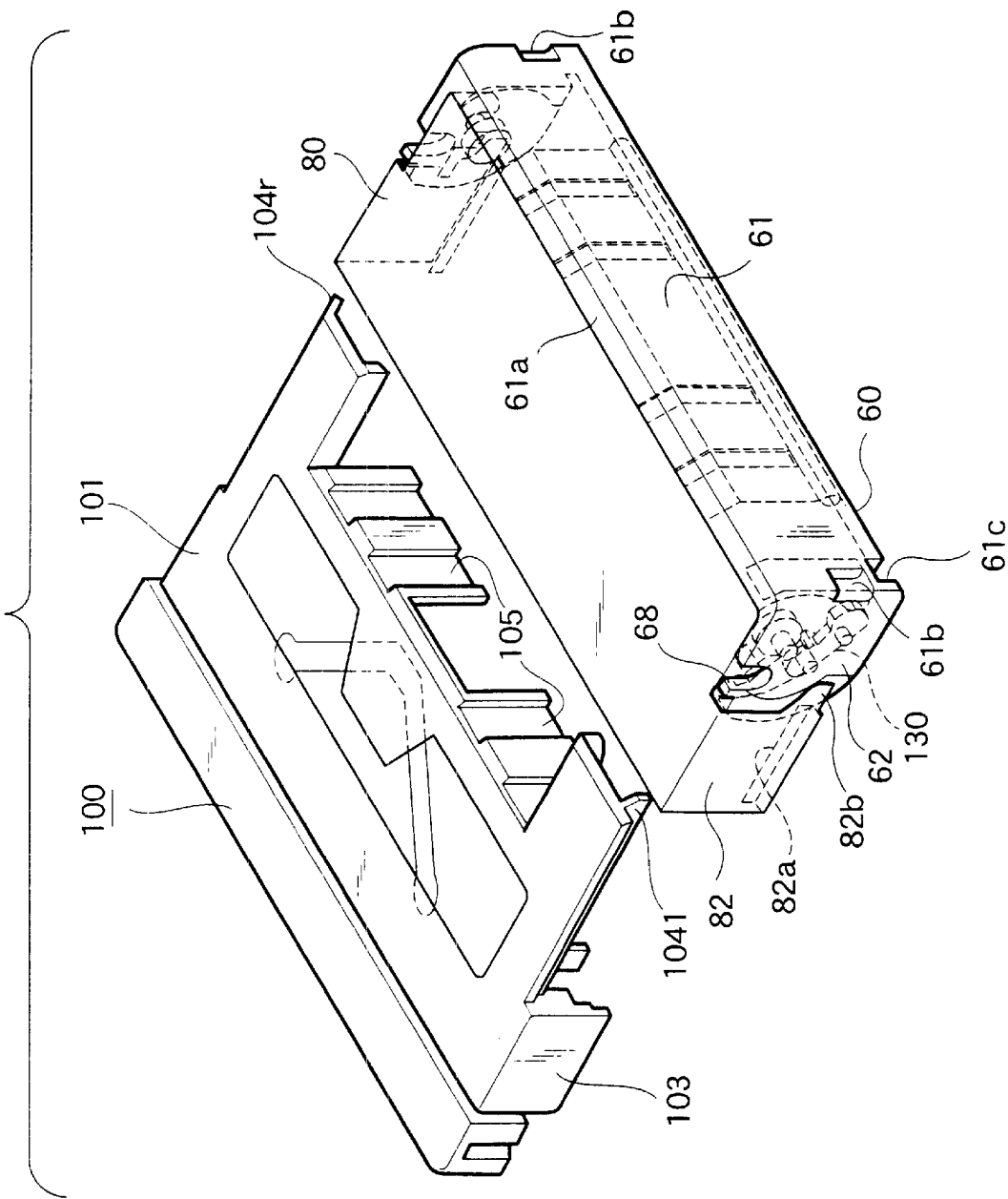
FIG. 6 is a perspective view showing the upper-shell unit and the slider unit while they are separated from each other.
Figure 20A:
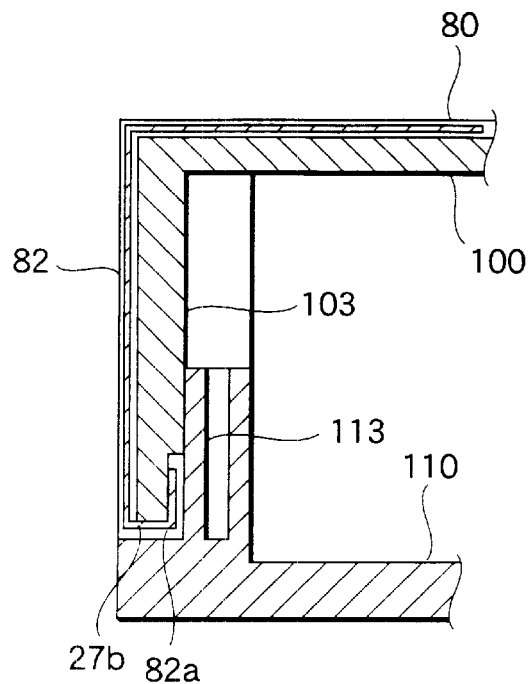
FIGS. 20A and 20B are enlarged sectional views along the XX—XX line of FIG. 19, which respectively show the left-end portion and the right-end portion of the tape cassette.
Figure 20B:
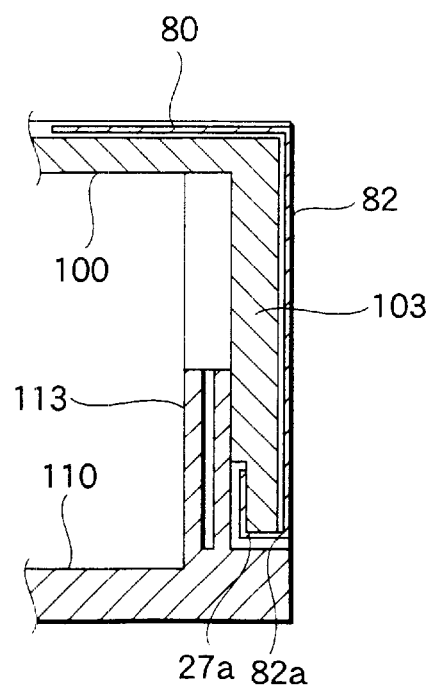
Figure 22:
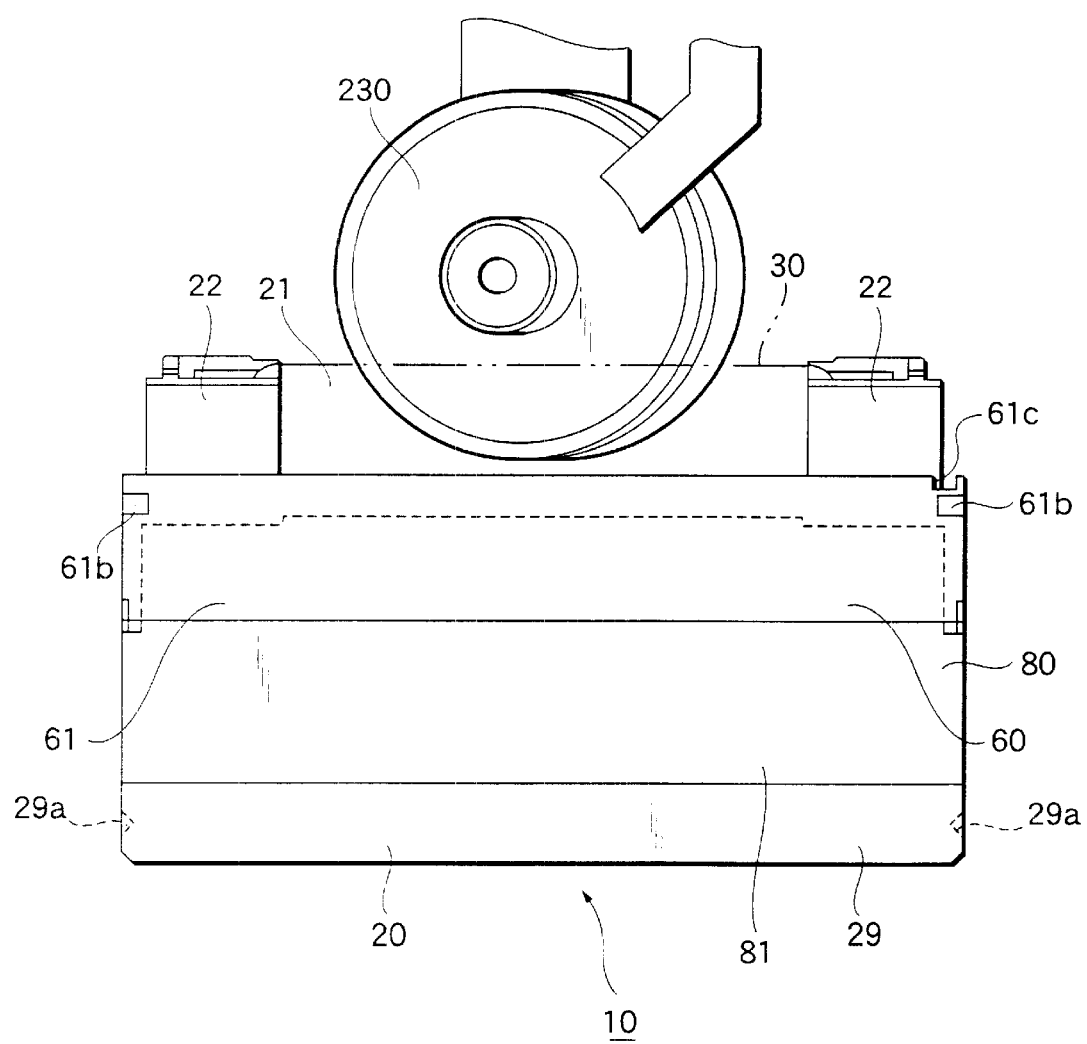
FIG. 22 is a schematic plan view showing the state which the tape cassette is mounted at the predetermined mount position of the recording/reproducing apparatus.
Figure 23:
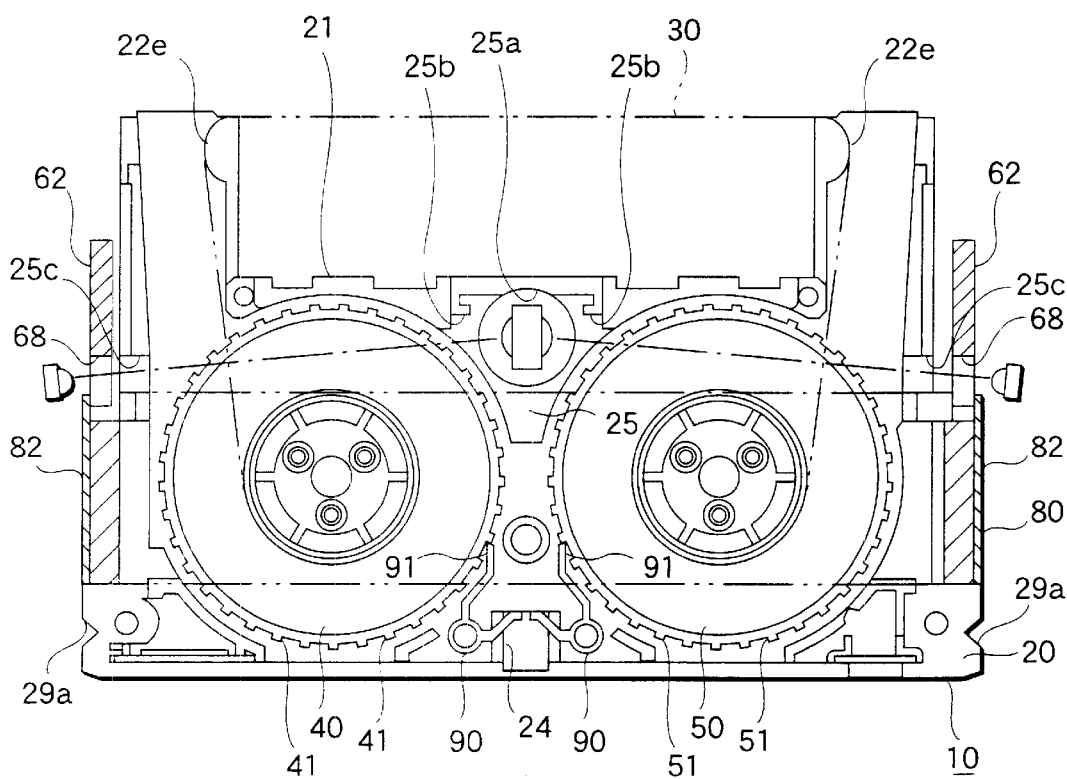
FIG. 23 is a schematic horizontal sectional view in a state where the tape cassette is mounted at the predetermined mount position of the recording/reproducing apparatus.

The slider unit is fabricated into the upper-shell coil while the front lid 60 is upwardly rotated. That is, the slider 80 is slid backward while the main portion 81 of the slider 80 is mounted on the front-end portion of the upper-surface portion 101 of the upper shell 100, whereby the slide-fitting portions 82a of the slider 80 are freely slidably fitted to the lower-end edges of the side-surface rear portions 103 of the upper shell 100 (see FIG. 20). The slide projections 83b and 83c of the slider 80 are located at the lower sides of the side-surface front portions 104l and 104r of the upper shell 100, and the upwardly-bent tip portions 83b' and 83c' of the slide projections 83b and 83c are fitted to the inner surfaces of the side-surface front portions 104l and 104r (see FIG. 6, FIG. 7). The state shown in FIG. 7 indicates a state where the slider unit having the front lid 60 fabricated in the slider 80 is fabricated in the upper-shell unit.

In this state, the upper-shell unit having the slider unit fabricated therein is coupled to the lower-shell unit. That is, the lower-end of each portion of the upper shell 100 of the upper-shell unit is butted to the upper end of each portion of the lower shell 110 of the lower-shell unit from the upper and lower sides. Under this state, the slider 80 is slid to the front end, and the front lid 60 is downwardly rotated. With this operation, the small-diameter portion 65c of the left rotational support shaft 65 at the left side of the front lid 60 of the front lid 60 as being viewed from the front side is freely-slidably fitted to the shallow slide groove 28b formed in the side surface at the left-side of the cassette shell 20 as being viewed from the front side, and the rotational-support shaft 66 at the right side is freely slidably fitted to the shallow slide groove 28b formed in the side surface at the right side of the cassette shell 20. Accordingly, the rotational support shafts 65 and 66 of the front lid 60 are movable in the forward/backward direction while the movement thereof in the up-and-down direction thereof is restricted by the slide grooves 28b.

In this state, the upper and lower shells 100 and 110 are coupled to each other by screws 120 (see FIG. 7), thereby completing the tape cassette 10 (see FIG. 1).

As described above, in the tape cassette 10, the overall constituent parts are grouped into the three portions of the lower-shell unit, the upper-shell unit and the slider unit as if they are three parts, and these units are successively fabricated as described above, so that the management of the parts in some midpoint of the fabrication process can be easily performed and the fabrication itself can be simply performed.

Under the non-use state, the front and back sides of the magnetic tape 30 are covered by the front lid 60 and the back lid 70, the lower side thereof is covered by the lower-end closing portion 72 of the back lid 70, and the upper-side thereof is covered by the upper-end portion 61a of the main portion 61 of the front lid 60. Accordingly, adhesion of dust to the magnetic tape 30 and touching of the magnetic tape 30 by foreign matter or fingers can be prevented. The front-end surfaces of the tape drawing portions 22, that is, 22b, 22c, 22d, etc., are covered by the main portion 61 of the front lid 60, and thus it is made look more attractive. The hook pawl 132 of the lid-lock member 130 is hooked to the upper surface of the slide projection 83b of the slider 80 from the back side, whereby the front lid 60 is locked at the closing position shown in FIG. 1.

As omitted from the illustration, an erroneous deletion-preventing tag is provided on the back surface of the cassette shell 20, and the erroneous deletion-preventing tag is moved in the height direction of the cassette shell 20 to set a recordable state or unrecordable state.

Further, the lid-support portions 83 of the slider 80 are located at farther inward positions than the main-surface portions 82, and thus the outer surfaces of the side-surface portions 62 of the front lid 60 supported by the lid-support portions 83 and the outer surfaces of the main-surface portions 82 of the slider 80 are located substantially on the same plane. Therefore, the steps 170 between the projections 29 and the substantially latter-half portions of the side surfaces of the cassette shell 20 with which the main-surface portions 82 of the slider 80 are brought into contact, that is, the surfaces of the side surface rear portions 103 of the upper shell 100 excluding the rear-end portions are extremely small, that is, the thickness thereof corresponds to the plate thickness of the main surface portions 82 of the slider 80.

Next, use of the tape cassette 10 described above will be described.

Plate-shaped support members 180l and 180r are erected at the positions corresponding to both ends of the tape cassette 10 of the cassette holder (not shown) for holding the tape cassette 10 and loading the tape cassette 10 to a predetermined position of a recording/reproducing apparatus, and lid openers 190 and lid press projections 200 are provided to the support members 180l and 180r.

The lid openers 190 are designed in the form of a long arm, and the upper-end portions thereof are freely rotatably supported on the upper-end portions of the inner surfaces of the support members 180l and 180r. Fitting projections 191 are projectingly provided to the inner surfaces of the rotational end portions of the lid openers 190. The coil portions 211 of the torsion-coil springs 210 are fitted to the outer peripheries of the rotational shafts 192 of the lid openers 190. From the upper side, one-side arms 212 come into elastic contact with spring-hook pieces 181 formed by inwardly projecting parts of the support members 180l and 180r as if they are cut and erected, and the other-side arms 213 come into elastic contact at the positions near to the rotational-support points of the front edges of the lid openers 190, whereby the lid openers 190 are urged in a clockwise direction as being viewed from the left side (see FIG. 14). The portions of the lid openers 190 which are near to the upper ends thereof abut against the spring-hook pieces 181, whereby they are kept in a vertical position so that the rotational ends thereof are located at the lower ends.

The lid-press projections 200 are formed on the upper-end portions of the support members 180l and 180r so as to project inwardly.

A lock-release cam 220 is provided so as to be proximate to the right-side surface of the base-end portion of the support member 180l at the left-side. The lock-release cam 220 is designed so that the end-surface side thereof into which the tape cassette 10 is inserted serves as a slant portion 221. The width in the right-and-left direction of the lock-release cam 220 is set to be slightly smaller than that of the insertion notch 61c formed in the front-surface portion 61 of the front lid 60.

Figure 16:
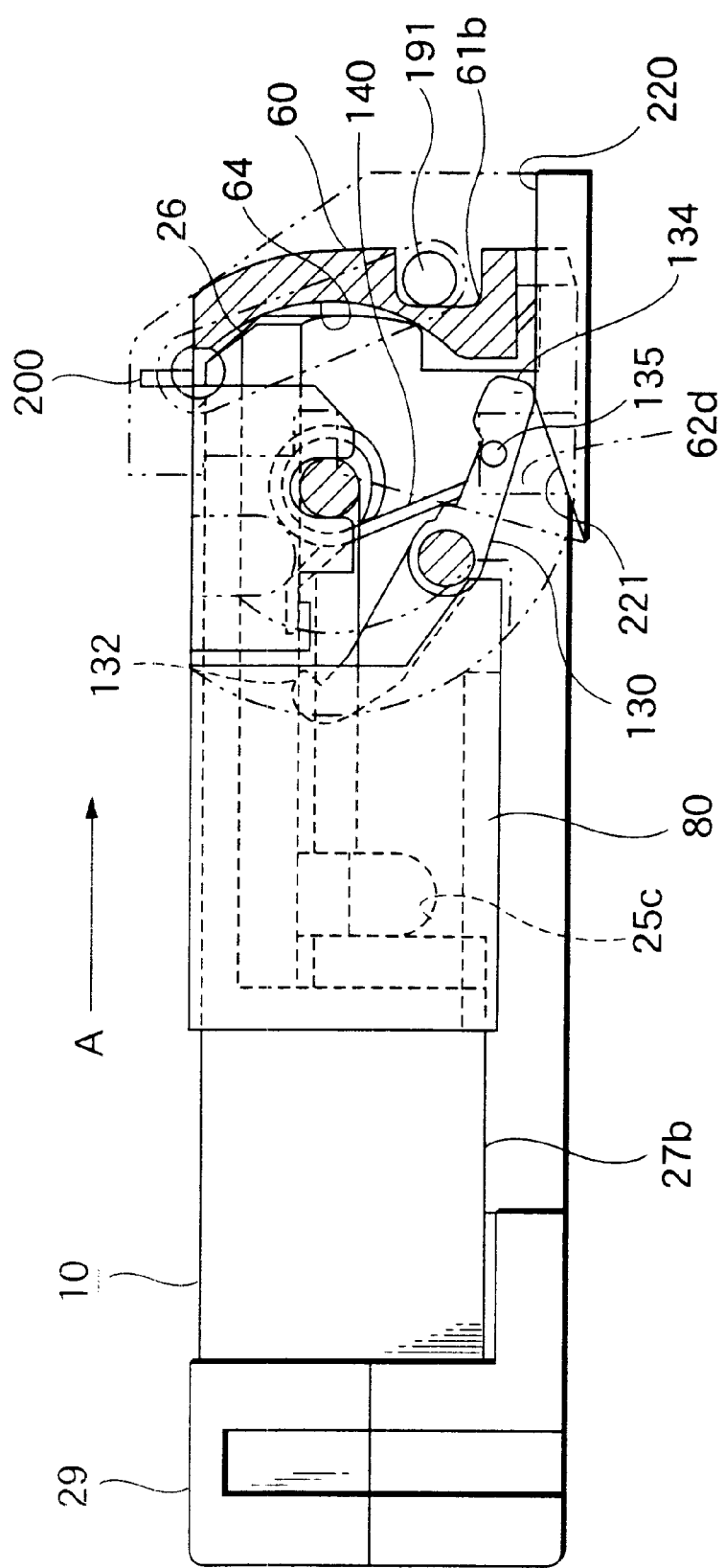
FIG. 16 is a schematic notched side view showing the main part in a state where the lock of a lock member is released.

When the tape cassette 10 is inserted into the cassette holder from the front-surface side, that is, the side of the front lid 60 in the direction of the arrow A, the front-end portion of the tape cassette 10 is inserted between the support members 180l and 180r. The lock-release cam 220 is relatively inserted from the insertion notch 61c formed in the front-surface portion 61 of the front lid 60 into the inside of the front lid 60. At this time, as described above, the forwardly-facing steps 170 formed at the rear-end portion of the cassette shell 20 are extremely small, and thus the steps 170 are not hooked to the inlet of the cassette holder or the like. The fitting projections 191 of the lid openers 190 are fitted to the fitting recess portions 61b of the front lid 60, and the lower-end arcuate face 134 of the lid-lock member 130 is sliped up along the slant portion 221 of the lock-release cam 220, whereby the lid-lock member 130 is rotated in a counterclockwise direction in FIG. 16 and the hook of the hook pawl 132 to the slide projection 83b of the slider 80 is released. Accordingly, the lock of the front lid 60 at the closing position is released.

Figure 17:
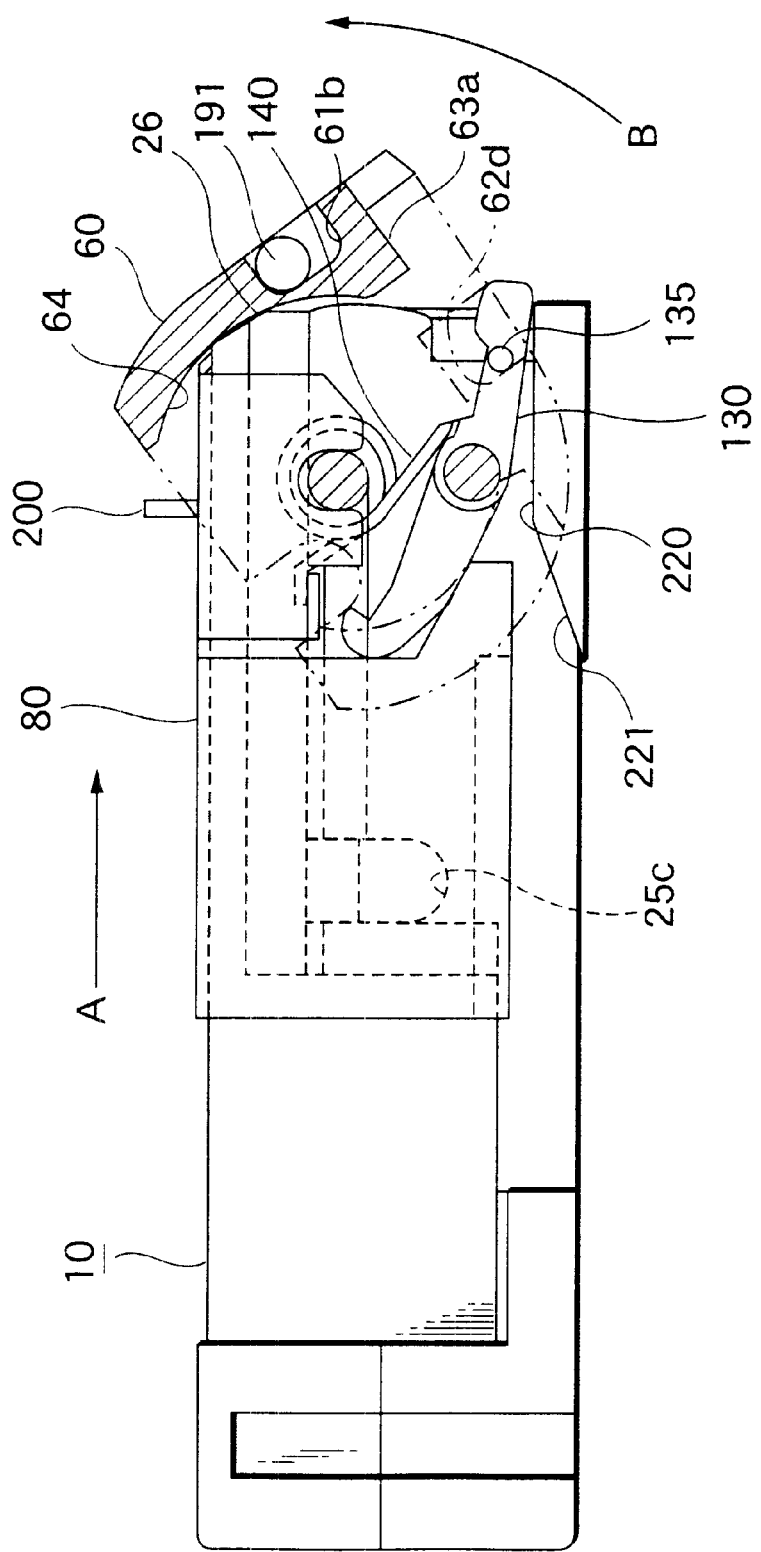
FIG. 17 is a schematic notched side view showing the main part in the state subsequent to FIG. 16.

When the tape cassette 10 is further inserted into the cassette holder from the above state, that is, it is moved in the direction of the arrow A in the figure, the fitting projections 191 provided to the rotational ends are pressed in the direction of the arrow A, and thus the lid openers 190 are rotated in the counterclockwise direction as being viewed in FIG. 17, that is, in the direction of the arrow B. Accordingly, the fitting projections 191 are upwardly moved, and the front lid 60 in which the fitting projections 191 are fitted to the fitting-recess portions 61b is rotated in the counterclockwise direction, that is, in the direction of the arrow B.

Force is applied to the slider 80 through the front lid 60 by the fitting projections 191 of the lid openers 190 so that the slider 80 moves backward relative to the cassette shell 20. However, since the regulating faces 64 of the front lid 60 abut against the cam portions 26 of the cassette shell 20, the slider 80 cannot move backward relative to the cassette shell 20, and only the front lid 60 is upwardly rotated. The lock pin 68 provided to the front lid 60 is fitted to the fitting-recess portion 133 of the lid-lock member 130 (see FIG. 17).

In the state shown in FIG. 17, the lock pin 135 of the lid-lock member 130 abuts against the inner surface of the rear side of the recess portion 62d formed in the side-surface portion 62 at the left side of the front lid 60. As the front lid 60 is further rotated in the direction of the arrow B from the above state, the lock pin 135 is pulled in the direction of the arrow B by the inner surface of the rear side of the recess portion 62d, whereby the lid-lock member 130 also is rotated in the direction of the arrow B.

When the front lid 60 is rotated from the first state (the closed state shown in FIG. 14) in the direction of the arrow B by 90 degrees, the engagement between the regulating faces 64, 64 of the front lid 60 and the cam portions 26 of the cassette shell 20 is released (see FIG. 18), and the slider 80 is allowed to be backwardly movable relative to the cassette shell 20. In the state shown in FIG. 18, the lid press projections 200 formed on the support members 180l and 180r are kept to be proximate to the upper end of the front-surface portion 61 of the front lid 60 from the rear side. Since the overlap portions 82b of the slider 80 are located outside of the overlap portions 62c of the side-surface portions 62 of the front lid 60, the outsides of the overlap portions 62c serving as the rear-edge portions of the side-surface portions 62 are supported by the overlap portions 82b of the slider 80 during the rotation of the front lid 60, whereby the front lid 60 is smoothly and stably rotated.

Figure 18:
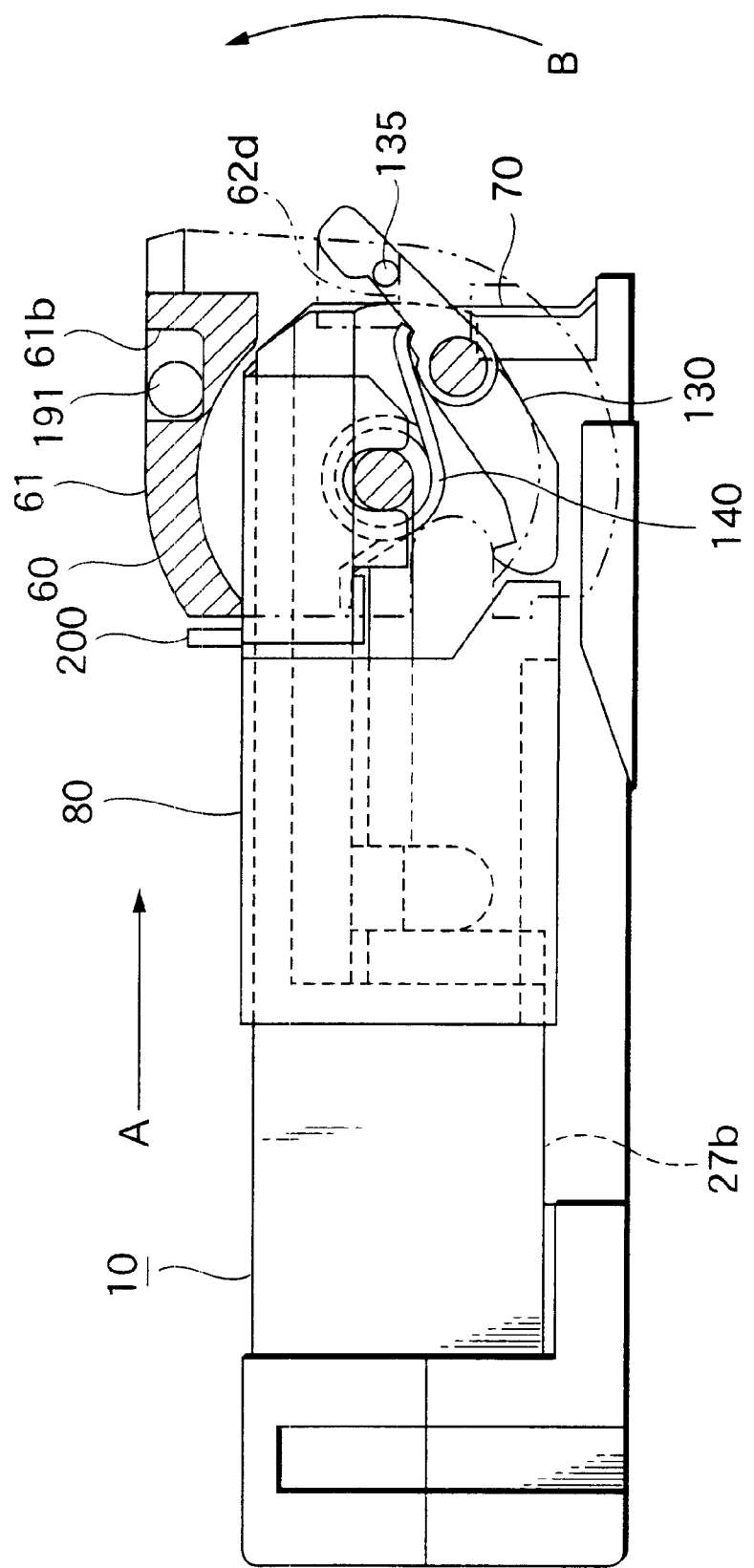
FIG. 18 is a schematic notched side view showing the main part in a state where the front lid reaches an open position.

When the tape cassette 10 is further moved to a deeper position of the cassette holder, that is, in the direction of the arrow A from the state of FIG. 18, the front lid 60 and the slider 80 on which the front lid 60 is supported cannot move in the direction of the arrow A because the fitting projections 191 of the lid openers 190 are fitted to the fitting recess portions 61b, and thus they are left at that place as they are. Therefore, the slider 80 is moved backward relatively to the cassette shell 20 together with the slider 80. It is needless to say that the back lid 70 is moved backward relative to the cassette shell 20. The back lid 70 is moved straightly backward and separated from the magnetic tape 30. Therefore, as compared with the prior art in which the back lid is moved in a slanting upward and backward direction by using a cam to separate it from the magnetic tape, there is less likelihood that the magnetic tape 30 is involved, and the magnetic tape 30 suffers no damage due to involvement by the back lid 70. Further, since the back lid 70 is formed integrally with the slider 80 by the metal plate having conductivity, the back lid 70 is hardly charged, and there is no probability that the back lid 70 electrostatically involves the magnetic tape 30. Therefore, when the magnetic tape 30 is loaded to a predetermined position, there can be prevented an accident that the magnetic tape 30 runs up on a guide or the like.

Figure 19:
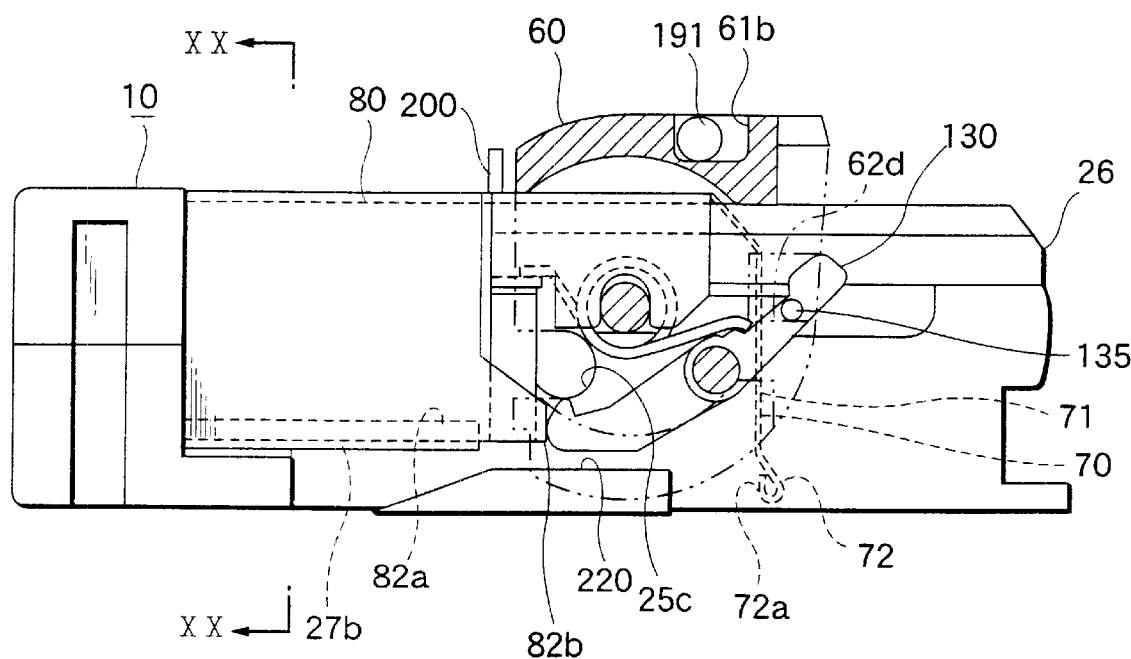
FIG. 19 is a schematic notched side view showing the main part in a state where the slider is moved back and both the front lid and the back lid reach their lid-open positions.

The insertion-completion position of the tape cassette 10 in the cassette holder is defined as the position at which the respective front-end faces 22b, 22c and 22d of the tape-drawing portions 22 serving as the advance stoppers abut against stoppers (not shown) provided to the cassette holder (see FIG. 19).

Under the insertion-completion position, the back lid 70 is backed at the deepest position of the mouth portion 21, and the light-transmissible holes 68 formed at the side-surface portions 62 of the front lid 60 are coincident with the light-transmissible holes 25c formed on the side surfaces of the cassette shell 20. Under the non-use state, the light-transmissible holes 25c of the cassette shell 20 are closed by the main-surface portions 82 of the slider 80, and foreign matter, such as dust or the like, can be prevented from invading from the light-transmiissible holes 25c into the cassette shell.

It is necessary to press the tape cassette 10 downwardly so that it is not floated from the cassette holder. In this case, it is better to press the tape cassette 10 downwardly through the slider 80 of metal. In this case, the back lid 70 can be prevented from being charged by forming the member for pressing the slider 80 of conductive material and bringing the member into contact with the ground member of the cassette holder.

The elastic force of the torsion-coil spring 140 does not act to make the cassette shell 20 float from the cassette, because the front lid 60 is brought into elastic contact with the upper-surface of the cassette shell 20. That is, conventionally, the open state of the front lid is held by the lid-opening member provided to the recording/reproducing apparatus side, so that the elastic force of the spring which urges the front lid in the lid-closing direction acts on the lid-opening member and the repulsive force thereof acts to make the cassette shell float from the cassette holder. However, in the tape cassette 10 described above, the elastic force of the torsion-coil spring 140 merely acts to bring the front lid 60 into elastic contact with the upper-surface of the cassette shell 20.

As described above, in order to move the lids 60 and 70 to the lid-opening positions, such a sequential operation that the front lid 60 is first rotated to the lid-opening position and then the slider 80 is moved backward so that the back lid 70 is moved to the lid-opening position can be performed by utilizing such a structure that the cam portions 26 are formed in the cassette shell 20 and the cam portions 26 are fitted to the regulating faces 64 of the front lid 60 while there is used such a simple structure as the lid openers 190 serving as rotating arms.

When the tape cassette 10 is inserted to the insertion completion position, described above, in the cassette holder, the cassette holder moves to a predetermined position (normally descends) to load the tape cassette 10 to a predetermined mount position.

When the tape cassette 10 is mounted at the predetermined mount position, the reel tables (not shown) invade from the reel-stand insertion ports 23 into the cassette shell 20 and the tape reels 40 and 50 are mounted on the reel tables. In addition, the reel-fitting shafts provided to the reel tables are fitted into the fitting holes of the tape reels 40 and 50, and a rotational-head drum 230, a drawing guide, a pinch roller (not shown), etc. are inserted into the mouth portion 21. A light-emitting portion of a sensor for detecting the leading end and the trailing end of the magnetic tape 30 is inserted in the light-shielding barrel 25, and a photodetecting portion of the sensor is disposed in the vicinity of the light-transmissible holes 68 (overlapped with the light-transmissible holes 25c of the cassette shell 20) of the front lid 60, whereby the light-emitting portion and the photodetecting portion of the sensor are disposed so as to face each other through the magnetic tape 30.

The drawing guide, the pinch roller, etc. move to draw out the magnetic tape 30 from the cassette shell 20, wind the magnetic tape 30 around the rotational-head drum 230 by a predetermined winding angle and also form a predetermined tape pass.

In the tape cassette 10, the upper portion of the mouth portion 21 is released unlike such a type that the front lid is merely rotated upwardly to open the lid and such a type that the back lid is accommodated at the upper side of the mouth portion when the lid is opened. Accordingly, the rotational-head drum 230 can be located so as to project from the upper surface of the mouth portion 21 (see FIG. 21), and thus, for example, the slant angle of the rotational-head drum 230 can be increased to increase the azimuth angle of the recording track, whereby the crosstalk between recording tracks can be reduced to enhance the recording density.

When recording or reproducing on the magnetic tape 30 is completed, the members, such as the drawing guide, the pinch roller, etc., are moved into the mouth portion, and an extra magnetic tape 30 is wound around one tape reel 40.

Figure 24:
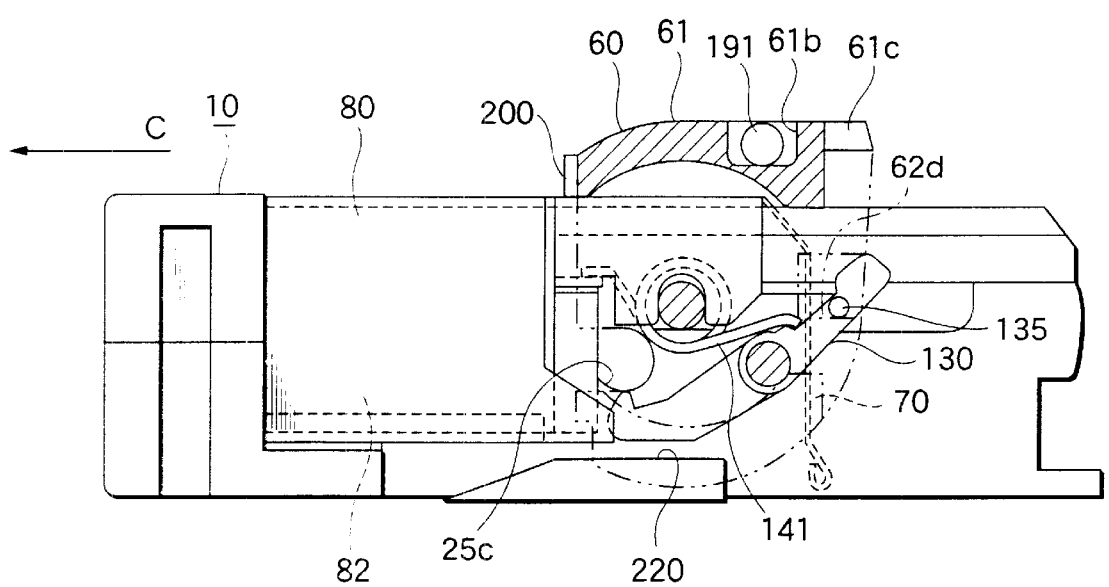
FIG. 24 is a schematic notched side view showing the main part in a state where the slider is started to be moved to the front end.

Thereafter, the cassette holder is returned to the insertion-completion position, and then the tape cassette 10 is moved in the unload direction, that is, in the direction of the arrow C in FIG. 24.

When the tape cassette 10 is moved in the direction of the arrow C, the lid-press projections 200 provided to 180*l* and 180*r* relatively press both sides of the upper-end portion of the front-surface portion 61 in the direction opposite to the direction of the arrow C, whereby the front lid 60 and the slider 80 (together with the back lid 70) are moved toward the front-end of the cassette shell 20.

Figure 25:
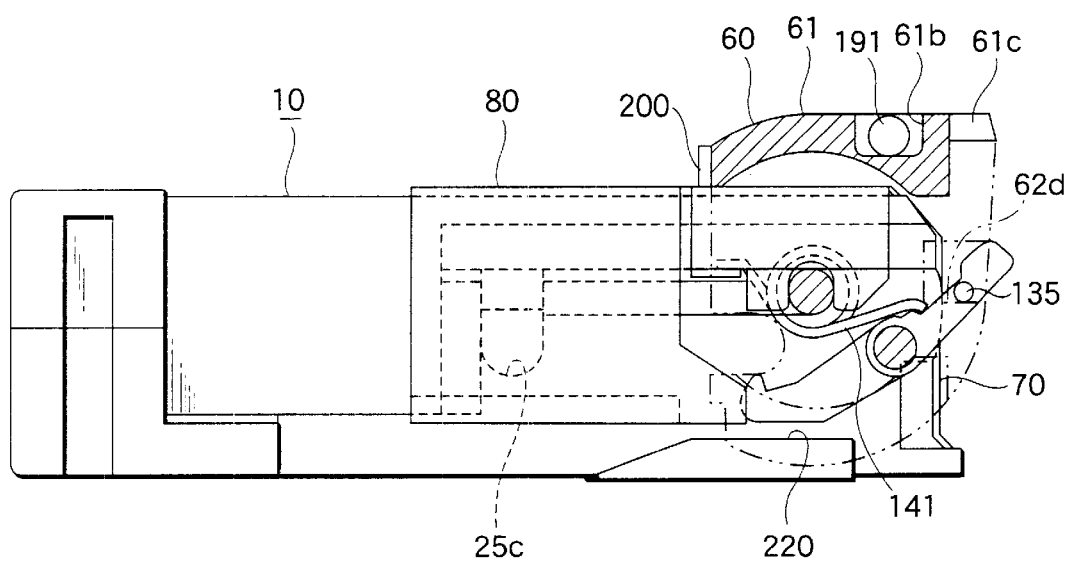
FIG. 25 is a schematic notched side view showing the main part in a state where the slider reaches the front end of a movable region.
Figure 26:
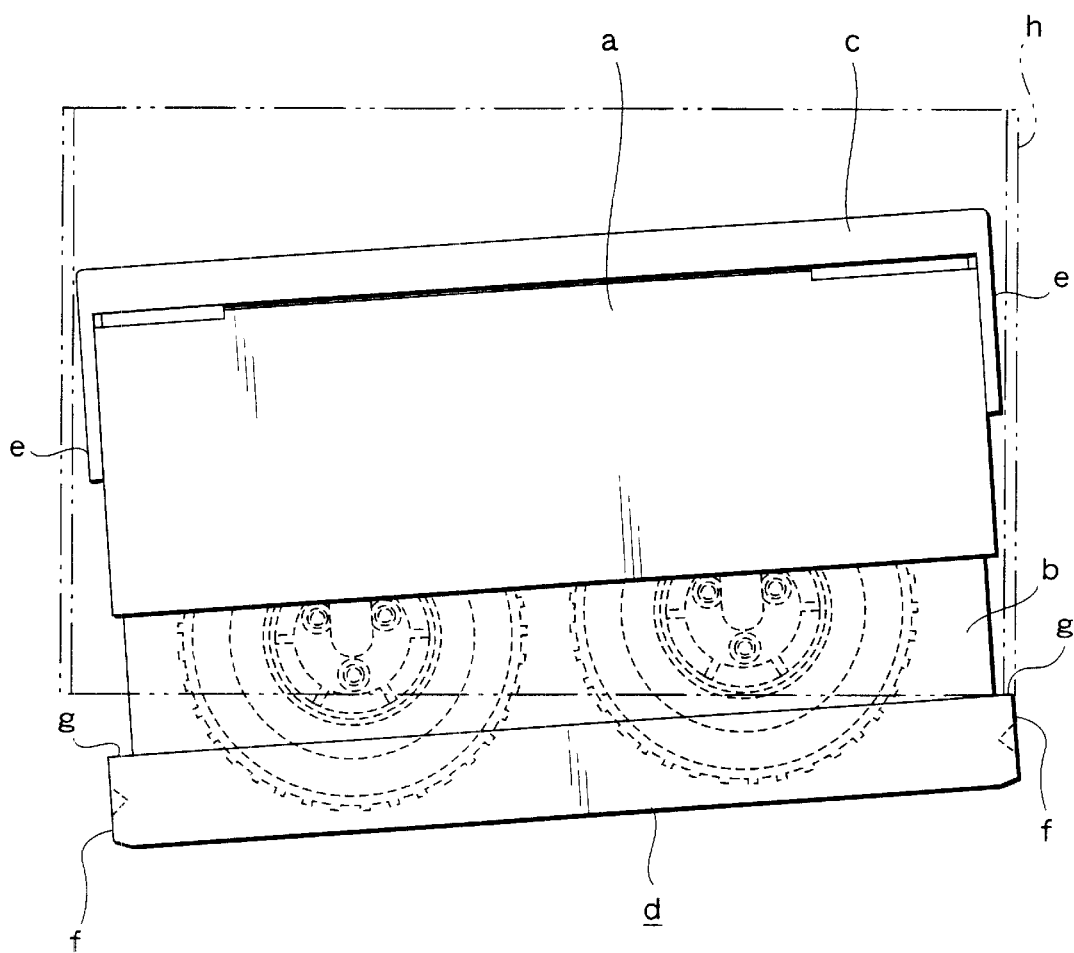
FIG. 26 is a schematic notched side view showing the main part when the slider reaches the front end of the movable range.

When the slider 80 covers the front end of the movable region (see FIG. 25), the lower-end portions 63*a* of the thick portions 63 of the front lid 60 are detached from the upper surface of the cassette shell 20, so that the front lid 60 is set to be downwardly rotatable. By the urging force of the torsion-coil spring 140 applied through the lid-lock member 130, the front lid 60 is downwardly rotated, reaches the lid closing position and covers the magnetic tape 30 in cooperation with the back lid 70 advanced. The hook pawl 132 of the lid lock member 130 is fitted to the upper surface of the slide projection 83*b* of the slider 80. Then, the tape cassette 10 is taken out of the cassette holder (not shown).

Each projection 29 formed at the rear-end portion of the cassette shell is projected in the lateral direction so as to be located at the outside of the side surface of the slider 80, and it serves as a portion to be grasped by an automatic changer when the automatic changer of the tape cassette is used.

In the tape cassette 10, the lid-support portions 83 of the slider 80 are located so as to be retracted farther inwardly than the main-surface portions 82, so that the outer surfaces of the side-surface portions 62 of the front lid 60 supported on the lid-support portions 83 and the outer surfaces of the main-surface portions 82 of the slider 80 are located substantially on the same plane. Therefore, the steps 170 between the projections 29 and the substantially- latter-half portions of the side surfaces of the cassette shell 20 with which the main-surface portions 82 of the slider 80 are brought into contact, that is, the surfaces of the side-surface-rear portions 103 of the upper shell 100 excluding the rear end portions, are extremely small, that is, the thickness thereof corresponds to the plate thickness of the main-surface portions 82 of the slider 80. Since the steps 170 are extremely small, as described above, they are prevented from being hooked to the inlet or the like of the holder.

Further, since the overlap portions 82*b* of the slider 80 are located outside of the overlap portions 62*c* of the side surface portions 62 of the front lid 60, the overlap portions 62*c* serving as the rear-edge portions of the side-surface portions 62 are supported by the overlap portions 82*b* of the slider 80 during the rotation of the front lid 60, whereby the front lid 60 is smoothly and stably rotated.

The shape and structure of each part described in the above embodiment are mere embodiments carried out when the present invention is put into practice, and thus the technical scope of the present invention should not be limitedly interpreted on the basis of these embodiments.

As is apparent from the foregoing description, according to a first aspect of the present invention, a tape cassette in which a mouth portion opened in forward and up-and-down directions is provided at the front portion of a cassette shell accommodating therein tape reels having a tape-shaped recording medium wound therearound, a part of the tape-shaped recording medium is located so as to traverse the front end of the mouth portion, and a front lid for covering the front side of the tape-shaped recording medium is provided, is characterized in that a slider is provided so as to be freely movable forwardly and downwardly; each side-surface portion of the slider along the side surface of the front lid has a lid-support portion at the front-end portion thereof and a main-surface portion located outside of the lid-support portion; the front lid has a front-surface portion covering the front surface of the tape-shaped recording medium, and side-surface portions projecting backwardly from both the ends of the front surface portion, the side surface portions being freely rotatably supported to the lid-support portion of the slider; and the front-end portions of the slider and the side-surface portions of the front lid have overlap portions which are overlapped with each other in the right-and-left direction.

Accordingly, in the tape cassette of the present invention, the main-surface portions of the slider are located so as to be more outwardly projected than the lid-support portions thereof, and thus the corresponding slide portions of the side-surfaces of the cassette shell along which the main surface portions of the slider are slid are located so as to be more outwardly projected than these of the prior art. Therefore, the step occurring between each rear end portion and each slide portion can be reduced. Further, the overlap portions are provided to the front end portions of the main surface portions of the slider and the side surface portions of the front lid so as to be overlapped with each other in the right-and-left direction. Therefore, the overlap portions of the front lid are guided by the overlap portions of the slider during rotation of the front lid, so that the opening/closing operation of the front lid is carried out smoothly.

According to a second aspect of the present invention, the overlap portions of the front lid are formed as portions having recess portions which are more deeply recessed than the other portions of the side-surface portions, and the overlap portions of the slider are located so as to be slid along the recess portions. Therefore, the outer surfaces of the side-surface portions of the front lid and the outer surfaces of the main-surface portions of the slider can be located within the same plane, and an undesired unevenness at the side-surface portions of the cassette tape can be prevented, thereby making the cassette tape visually attractive.

What is claimed is:

1. A tape cassette in which a mouth portion opened in forward and up-and-down directions is provided at the front portion of a cassette shell accommodating therein tape reels having a tape-shaped recording medium wound therearound, a part of the tape-shaped recording medium is located so as to traverse the front end of the mouth portion, and a front lid for covering the front side of the tape-shaped recording medium is provided, characterized in that:

a slider is provided so as to be freely movable forwardly and downwardly;

each side-surface portion of said slider along the side surface of said front lid has a lid-support portion at the front-end portion thereof and a main surface portion located outside of said lid-support portion;

said front lid has a front-surface portion covering the front surface of the tape-shaped recording medium, and side surface portions projecting backwardly from both the ends of said front-surface portion, the side-surface portions being freely rotatably supported to the lid-support portion of said slider; and the front-end portions of said slider and the side-surface portions of said front lid have overlap portions which are overlapped with each other in the right-and-left direction.

2. The tape cassette as claimed in claim 1, wherein said overlap portions of said front lid are formed as portions having recess portions which are more deeply recessed than the other portions of the side-surface portions, and said overlap portions of said slider are located so as to be slid along said recess portions.

3. The tape cassette as claimed in claim 2, wherein said overlap portions of said front lid are formed to be overlapped with said overlap portions of said slider at all times during the shift process of rotating said front lid from a lid-closed state to a lid-open state.

4. The tape cassette as claimed in claim 1, wherein said slider is formed of metal material.

\* \* \* \* \*